United States Patent [19]
Kanazawa et al.

[11] Patent Number: 5,767,636
[45] Date of Patent: Jun. 16, 1998

[54] VEHICLE POWER GENERATING APPARATUS

[75] Inventors: Wakako Kanazawa, Toyokawa; Fuyuki Maehara; Yasuhiro Takase, both of Kariya, all of Japan

[73] Assignee: Nippondenso Co., Ltd., Kariya, Japan

[21] Appl. No.: 593,916

[22] Filed: Jan. 30, 1996

[30] Foreign Application Priority Data

| Jan. 31, 1995 | [JP] | Japan | 7-014625 |
| Oct. 17, 1995 | [JP] | Japan | 7-268495 |

[51] Int. Cl.$^6$ .......... H02J 7/04; H02J 7/14; H02P 9/10
[52] U.S. Cl. .......... 318/139; 318/140; 318/158; 320/64
[58] Field of Search .......... 318/139, 140–160; 290/4 R, 10, 40 R, 41 R, 42 R; 322/17, 18, 28, 24, 99, 27, 25, 7, 22, 23, 29, 14; 320/64, 30, 31; 180/65.4, 65.3, 65.1

[56] References Cited

U.S. PATENT DOCUMENTS

| 4,651,081 | 3/1987 | Nishimura et al. | 320/64 |
| 4,659,977 | 4/1987 | Kissel et al. | 320/64 |
| 5,001,642 | 3/1991 | Botzenhardt et al. | |
| 5,122,723 | 6/1992 | Sato | 320/64 |
| 5,231,344 | 7/1993 | Marumoto et al. | 322/14 |
| 5,264,764 | 11/1993 | Kuang | 318/139 |
| 5,321,231 | 6/1994 | Schmalzreidt et al. | 219/497 |
| 5,461,289 | 10/1995 | Adler et al. | 318/139 |
| 5,473,228 | 12/1995 | Nii | 318/158 |
| 5,550,445 | 8/1996 | Nii | 318/153 |
| 5,561,363 | 10/1996 | Mashino et al. | 322/25 |
| 5,581,172 | 12/1996 | Iwatani et al. | 322/28 |
| 5,589,743 | 12/1996 | King | 318/139 |

FOREIGN PATENT DOCUMENTS

| 4038301 | 6/1991 | Germany. |
| 4-197045 | 7/1992 | Japan. |
| 5-268733 | 10/1993 | Japan. |
| 7-046772 | 2/1995 | Japan. |
| 7-075262 | 3/1995 | Japan. |

OTHER PUBLICATIONS

Patent Abstract of Japan, vol. 018, No. 047 (E-1496), 1994 re JP-A 05268733.

*Primary Examiner*—Paul Ip
*Attorney, Agent, or Firm*—Cushman, Darby & Cushman IP Group of Pillsbury, Madison & Sutro LLP

[57] ABSTRACT

To provide a vehicle power generating apparatus capable of transmitting plural kinds of control signals from an external control device to a generated voltage control unit provided in a generator for power generation control while curbing increases in the size of apparatus or wiring required and without degrading the noise reduction characteristics, a generated voltage control device is normally disposed integrally with a generator for maintaining the generated voltage at a predetermined target level. For transmission of a vehicle condition signal from an external control device to the generated voltage control device, the vehicle condition signal is converted into a binary pulse train signal before being transmitted. The generated voltage control device holds the binary pulse train signal received or a vehicle condition signal decoded from the binary pulse signal until the next reception. Thereby, complicated power generation control can be achieved with a small amount of communications.

17 Claims, 22 Drawing Sheets

| CONTENT TRANS. (RUNNING COND.) | | CONTENT TRANS. (DETERM. DUTY VAL.) | | |
|---|---|---|---|---|
| CODE | CONTENT | CODE | CONTENT | |
| 0 0 | NORMAL | 0 0 0 | 100% | S0 |
| 0 1 | IDLE | 0 0 1 | 90% | S1 |
| 1 0 | DECEL | 0 1 0 | 80% | S2 |
| 1 1 | OTHER | 0 1 1 | 70% | S3 |
| | | 1 0 0 | 60% | S4 |
| | | 1 0 1 | 50% | S5 |
| | | 1 1 0 | 40% | S6 |
| | | 1 1 1 | — | S7 |

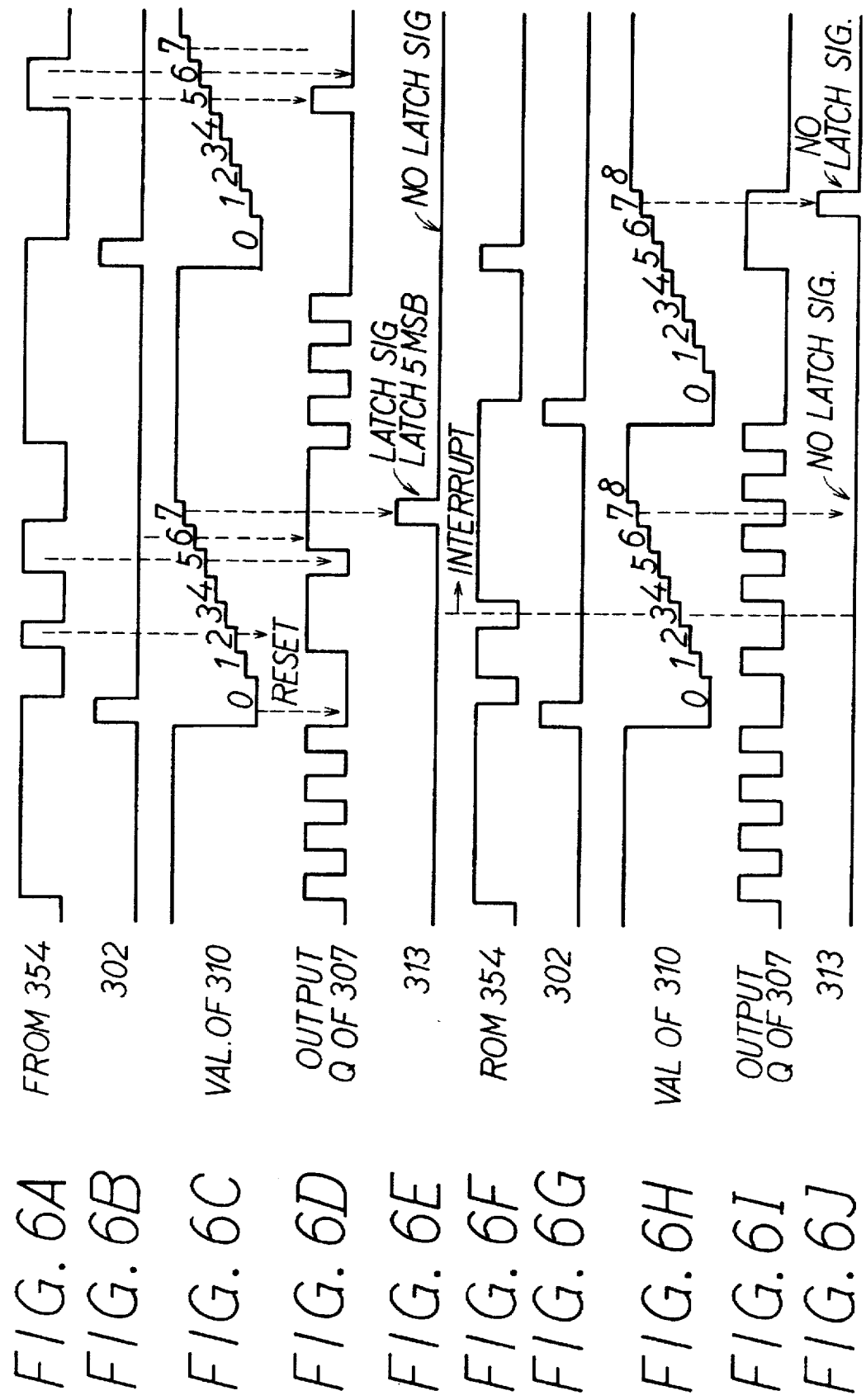

| DATA # | DATA STATUS | | |
|---|---|---|---|
| 1 | 0<br>1 | NORMAL GENERATION | |
| 2 | 0 1<br>1 0<br>1 1 | IDLE<br>DECEL.<br>OTHER | |
| 3 | 0 0 1<br>0 1 0<br>0 1 1<br>1 0 0<br>1 0 1<br>1 1 0<br>1 1 1 | | 100%<br>90%<br>80%<br>70%<br>60%<br>50%<br>40% |

IF OCCUR OF 1 IS ODD, THEN 0 EVEN, THEN 1

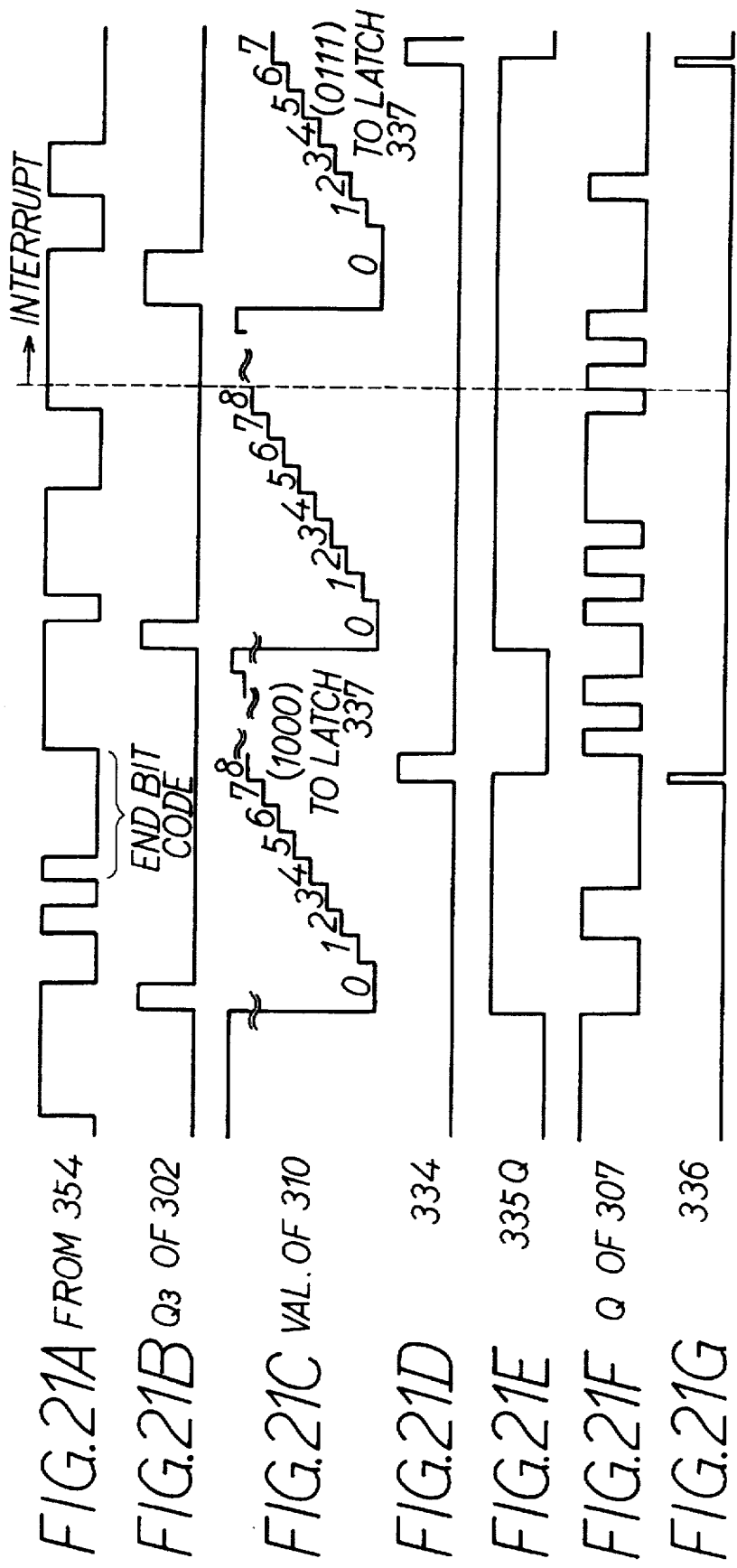

| #PULSES | RUNNING COND. | DETERM. DUTY VAL | DECODER 354 OUT. |
|---|---|---|---|
| 0 | NORMAL | | S0 |
| 1 | DECEL. | | S1 |
| 2 | OTHER | | S2 |
| 3 | IDLE | 100% | S3 |
| 4 | ↑ | 90% | S4 |
| 5 | | 80% | S5 |
| 6 | | 70% | S6 |
| 7 | | 60% | S7 |
| 8 | | 50% | S8 |
| 9 | | 40% | S9 |

VEHICLE POWER GENERATING APPARATUS

CROSS-REFERENCE TO RELATED APPLICATIONS

This application is related to and claims priority from Japanese Patent Application Nos. Hei. 7-14625 and 7-268495, incorporated herein by reference.

BACKGROUND OF THE INVENTION

1. Field of the Invention

The present invention relates to a power generating apparatus for a vehicle and, more particularly, to a vehicle power generating apparatus that controls power generation based on a vehicle condition signal from an external control device.

2. Description of Related Art

A conventional vehicle power generator control device controls an electrical generating device to maintain a generated voltage (for example, 14.5 V) that is considerably higher than the battery open terminal voltage (for example, 12.8 V) in order to quickly charge the battery. If the electric load is small relative to the generation capacity, this control may promote the charging of the battery to the fully charged state. If this condition continues after the battery has been fully charged, overcharge may occur; besides, engine load and fuel consumption increase.

Japanese Unexamined Patent Application Publication No. Hei. 5-268733, proposes a vehicle conditions-corresponding power generation control method for appropriate power generation control in which an external control device (for example, an ECU (engine control unit)) determines the current vehicle conditions to set a target value of the exciting current supplying rate (hereinafter, also referred to as "target duty ratio value"), and outputs the target duty ratio value as a PWM signal to a power generation control device (regulator).

Optimal power generation control can be achieved by methods other than the external control method as disclosed in the aforementioned publication in which an external control device (ECU) outputs a target duty ratio value as a PWM signal to the power generation control device (regulator) of the generator; for example, by a method in which the control mode of the regulator is changed or the constant value or the threshold set in the regulator is rewritten by an external control device transmitting to the regulator a vehicle condition signal indicating various vehicle conditions and vehicle running conditions or values, such as a constant, a threshold or an instruct value, calculated on the basis of such conditions, for the purpose of reduction of fuel consumption or reduction of engine torque fluctuation.

The above-described vehicle conditions-corresponding power generation control method using the PWM signal transmission is favorable if the method uses a single kind of vehicle condition signal whose level changes continuously or non-stepwise as a single control parameter. However, if the ECU is to constantly transmit a PWM signal to the regulator, it is not easy for the external control device (ECU) to perform the power generation control and other various routines for, for example, engine control by signal communications with the regulator and other various devices. Therefore, some measures must be taken for such a PWM signal power generation control method; for example, addition of a specific CPU having functions of PWM signal modulation and successive transmission.

Furthermore, to transmit a plurality of signals by the PWM communication method from the ECU to the regulator, a plurality of specific CPUs must be provided in the ECU together with specific transmission lines for parallel transmission of PWM signals from the ECU to the regulator. This construction will considerably increase the amount of wiring, space for wiring, amount of circuitry and power consumption that are required.

SUMMARY OF THE INVENTION

The present invention is intended to solve the above problems. An object of the invention is to provide a vehicle power generating apparatus that enables the signal transmission from an external control device (ECU) to the regulator (generated voltage control device) of a generator while curbing increases in the amount of wiring and the size of the device.

According to a first aspect of the present invention, a binary pulse train signal of a limited length outputted from an ECU is demodulated to a vehicle condition signal by a generated voltage control device, and the vehicle condition signal or the corresponding data pulse signal included in binary pulse signals is held at least until the next time the binary pulse train signal is received. Many kinds of vehicle condition signals can thereby be transmitted through a small number of transmission lines. In addition, since there is no need for the ECU to continue the transmission to the regulator, stable control can be performed without causing a non-control period if the transmission interval is increased. Furthermore, the ECU can perform other signal processing or signal communications without requiring a complicated construction.

Since this unit uses binary pulse signals of a predetermined pulse width, the signals can be easily modulated and demodulated. It is also easy to detect a change in the pulse width caused by contamination of noise and thereby determine that the change is an error. The reliability is thus increased considerably. In addition, since no accurate time measuring is required, the responsiveness is accordingly improved relative to a method using PWM signals. In addition, in the PWM signal transmission, the transmission voltage change becomes 0 at 0 duty, making it difficult to distinguish the 0 duty from short-circuit or disconnection of the transmission line. On the other hand, the construction facilitates detection of an eliminated change in a transmission line voltage caused by a short-circuit or disconnection of the transmission line as an accident, simply by, for example, adding redundant pulses (bits), since the construction employs pulses for communications.

It is possible that the system transmits plural kinds of vehicle condition signals by using the binary pulse train signals, thus further reducing the apparatus size and the signal processing operation load on the external control device (ECU). Also, it is possible that it serially transmits the binary pulse train signal through a single transmission line, thus reducing the amount of wiring, the space for the wiring and the amount of work for the terminal processing.

Moreover, it is possible that the system indicates a plurality of states of a vehicle condition signal or different vehicle condition signals by using combinations of a plurality of binary signal levels. The digital data used in the external control device (ECU) can be transmitted as data pulse signals without any particular processing. The signals received by the regulator can be held or processed easily by the CPU or a digital circuit, and can be converted into analog signals by a simple D/A converting circuit, thus facilitating the demodulation process. Also, it is possible that the system indicates a plurality states of the vehicle condition signal or different vehicle condition signals by combinations of a plurality of binary pulse signals that have pulse widths different from one another. Thereby, a state involving more than two discrete values are involved can be transmitted without a failure, and no synchronization with clock pulses is required. In addition, binary pulse train signals other than those having pulse width other a plurality of predetermined pulse widths can be removed as noise, thus improving the communication quality.

Even further, it is possible that the system indicates a plurality of states of the vehicle condition signal or different vehicle condition signals by a total number of a plurality of binary pulse signals, the unit enables unfailing communications by using simple modulating and demodulating circuits. In particular, binary pulse train signals having pulse widths other than a predetermined pulse width can be removed as noise, thus improving the communication quality. In addition, if is predetermined that a plurality of consecutive total numbers of pulses (for example, 13, 14, 15, 16, 17) indicate a certain signal value and 15 pulses are transmitted, accurate demodulation can be achieved if the total number of pulses received is changed by contamination of a noise pulse. Furthermore, since the conventional PWM method requires sharp edges (rising edge and falling edge) of transmission pulses for accurate measurement of pulse widths, the signal processing bands for the transmission line and the bands for analog signal processing circuits provided at both ends of the transmission line must be broadened. The noise spectrum is accordingly broadened, thus increasing the noise voltage. On the other hand, this unit needs only the number of pulses for transmission and requires only transmission and signal processing in a narrow band regarding pulse width and frequency, thus simplifying the circuitry construction and reducing the noise voltage.

Still further, it is possible that a leading pulse signal or an end pulse signal is added to a binary pulse signal.

Since each bit position in a data pulse signal can be specified by using these pulse signals, no synchronizing signals need to be transmitted through another transmission line. Moreover, the system may continue holding the data pulse signal or the vehicle condition signal previously received if, during a period of receiving the data pulse signal determined on the basis of the leading pulse signal or the end pulse signal, the leading pulse signal is detected or the end pulse signal is not detected, thus preventing improper power generation control based on a false received signal.

Still further, at least one of a running condition signal regarding vehicle running conditions, a battery condition signal regarding conditions of a vehicle installed battery, a model signal regarding vehicle models, and a load condition signal regarding conditions of energization of an electric load provided in the vehicle may be used for a vehicle condition signal, and the generated voltage control device generates a power generation control signal based on the vehicle condition signal obtained from the holding unit or based on the vehicle condition signal and a signal regarding power generation conditions obtained from the power generator, and the generated voltage control device controls the exciting current on the basis of the power generation control signal. Therefore, the unit enables power generation control in accordance with the vehicle running conditions or the types of vehicle appliances. In addition, the generated voltage control device (regulator) does not need to directly detect the conditions of the battery. Detection of the battery conditions can be performed without increasing the number of terminals. The ECU is enabled to change the regulator characteristics in accordance with various vehicle models. The number of types of regulators required can be reduced.

It is possible that the system changes the level of a binary pulse signal to be transmitted at least once within a predetermined length of time, and causes the holding unit to stop holding the vehicle condition signal or the data pulse signal previously received and then hold a predetermined signal if no level change of the binary pulse signal is received within the predetermined length of time period, for example, if a received signal remains at the high or low level for the predetermined length of time or longer after reception of a binary pulse train signal. Therefore, if the transmission line is disconnected or short-circuited, the unit can perform predetermined control to sustain appropriate power generation control.

Still further, it is possible that the system performs the power generation control only when it is determined that the key switch has been closed on the basis of the key switch closure signal received. Thus, the regulator does not need to have a terminal for detecting closure of the key switch, and a wire harness can be omitted. Also, the system may transmit a key switch closure signal at least once within a predetermined length of time period, while the key switch is closed. The key switch status can be monitored after the key switch has been closed. Thereby, the regulator can recognize the status of the key switch without a failure. The system may also transmit a special binary pulse signal as the key switch closure signal at least once within a predetermined length of time period, while the key switch is closed. The key switch status can be monitored after the key switch has been closed. Thereby, the regulator can further unfailingly recognize the status of the key switch.

Further, it is possible that the system changes a binary signal level of a signal to be transmitted at least once within a predetermined length of time period, while the key switch is closed. Therefore, the unit eliminates the need for transmitting a special key switch closure signal and thus eliminates the need for increasing the amount of transmission bits. The unit requires only a simple construction for monitoring the key switch status after the key switch has been closed. Thereby, the regulator can recognize the status of the key switch without a failure.

The system may determine that the key switch is closed if a received signal is a predetermined level of a binary signal, and determines that the key switch is not closed if reception of a binary signal of a level different from the level indicating closure of the key switch continues for a predetermined length of time period or longer, thus achieving substantially the same advantages as described above. It is also possible that the system determines that the key switch is not closed, upon reception of an electric potential status of a transmission terminal of the external control device where no electricity is supplied. A signal indicating disconnection of the key switch is transmitted to the regulator automatically when the key switch is turned off to stop power supply to the external control device. The construction can thereby be simplified.

It is further possible that the system continues the power generation control while the generator is generating power, if it is determined that the key switch is not closed. Thus, the unit enables the generated voltage control device to perform power control if it become impossible to transmit a signal regarding closure of the key switch from the external control device to the generated voltage control device because of, for example, disconnection of the communication line.

Other objects and features of the invention will appear in the course of the description thereof, which follows.

BRIEF DESCRIPTION OF THE DRAWINGS

Additional objects and advantages of the present invention will be more readily apparent from the following detailed description of preferred embodiments thereof when taken together with the accompanying drawings in which:

FIGS. 6A–6J are timing charts illustrating the signal status of various portions of the demodulating-holding unit shown in FIG. 5;

FIGS. 21A–21G are timing charts illustrating the signal status of various portions of the demodulating-holding unit shown in FIG. 20;

DETAILED DESCRIPTION OF THE PRESENTLY PREFERRED EXEMPLARY EMBODIMENTS

The preferred embodiments of the present invention are hereinafter described with reference to the accompanying drawings.

Figure 1:
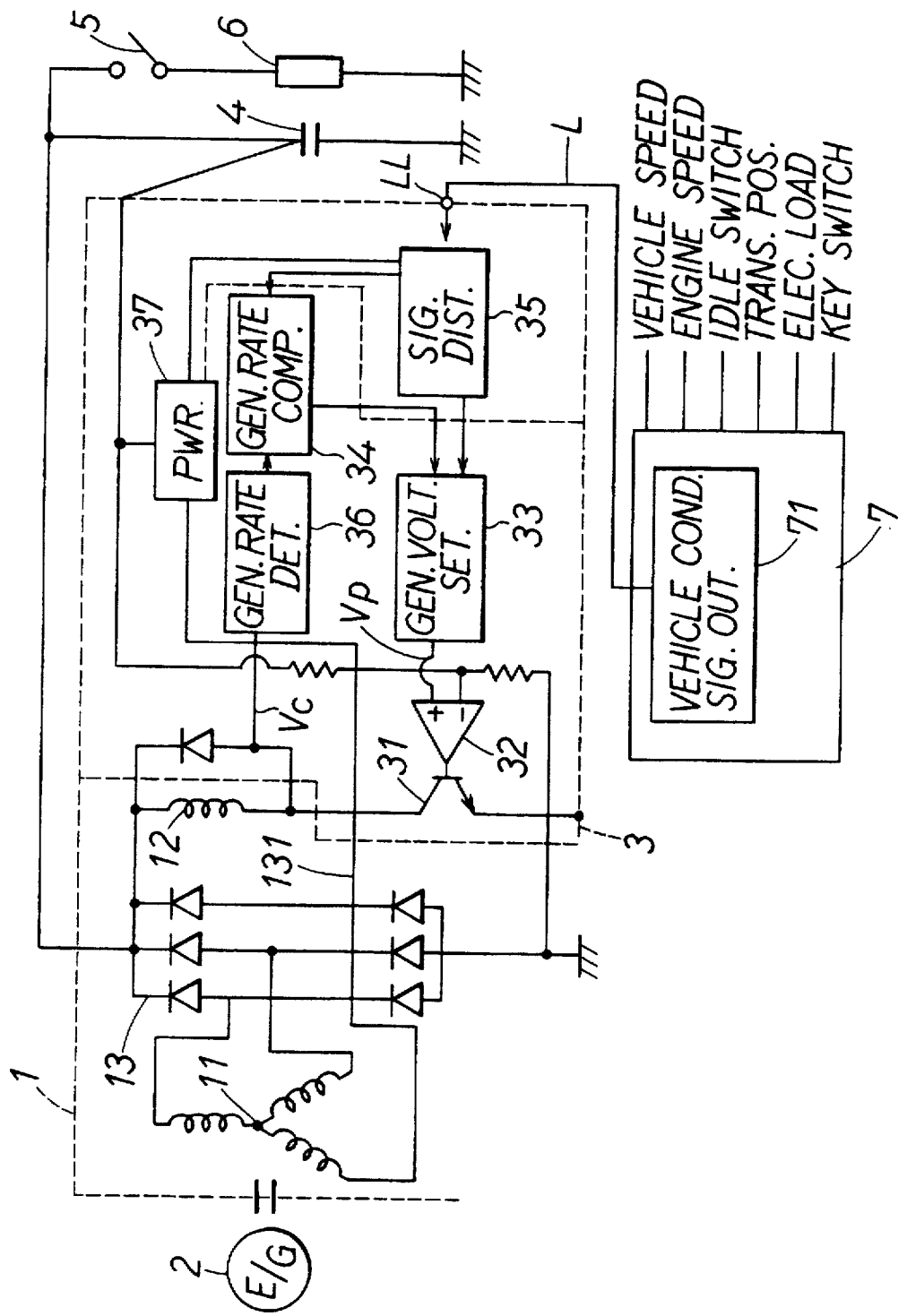
FIG. 1 is a block diagram of a vehicle power generating apparatus according to a first preferred embodiment of the present invention.

A first preferred embodiment of the present invention will be described with reference to FIG. 1.

Reference numeral 1 denotes a three-phase AC power generator (hereinafter, referred to as "alternator") driven by an engine 2. Reference numeral 11 denotes an armature winding; 12 denotes a field winding; and 13 denotes a three-phase full-wave rectifier. Reference numeral 3 denotes a generated voltage control device (regulator) contained in the alternator 1. Reference numeral 7 denotes an engine control device (ECU, or an external control device according to the invention).

The engine control device 7 forms a vehicle condition signal (also referred to as "control signal") based on various vehicle signals or vehicle running signals. The vehicle condition signal is transmitted from a vehicle condition signal generating unit 71 to a signal distinguishing unit 35 of the voltage control device 3 through a single signal line L. The signal distinguishing unit 35 transmits a vehicle running signal that constitutes a part of the vehicle condition signal received, to a generated voltage setting unit 33, and transmits a generating rate determination value (a target duty ratio value according to the invention) that constitutes another part of the vehicle condition signal received, to a generating rate comparing unit 34.

Generating rate determining unit 36 receives a voltage of a field current drive terminal (hereinafter, referred to as "F terminal") connected to the collector of a transistor 31 for switching field current, and extracts a generating rate signal therefrom, and transmits the generating rate signal to the generating rate comparing unit 34. The generating rate comparing unit 34 compares a generating rate determination value stored therein or the generating rate determination value received from the signal distinguishing unit 35 with a determined generating rate from the generating rate determining unit 36, and outputs the comparison result to the generated voltage setting unit 33. The generated voltage setting unit 33 determines a set generated voltage on the basis of the comparison result and the vehicle running signal from the signal distinguishing unit 35, and outputs the set generated voltage to the positive input of a voltage controlling comparator 32. The negative input terminal of the comparator 32 receives a divided voltage of the battery voltage. The comparator 32 compares the set generated voltage with the divided voltage of the battery voltage. Based on the result of comparison of the set generated voltage and the divided voltage of the battery voltage, the comparator 32 controls the energization of the transistor 31.

Reference numeral 37 denotes a power source circuit that is disposed in the generated voltage control device 3 and that is supplied with power from a battery 4. The power source circuit 37 receives an output signal from the signal distinguishing unit 35 and the single-phase generated voltage from the generator 1. When the signal and the voltage meet predetermined conditions, the power source circuit 37 energizes the units 33–36 provided in the generated voltage control device 3.

Reference numeral 4 denotes the battery that is charged by the rectifier 13. Reference numeral 6 is an electric load that is supplied with power from the battery 4 via a switch 5.

Figures 3, 4:
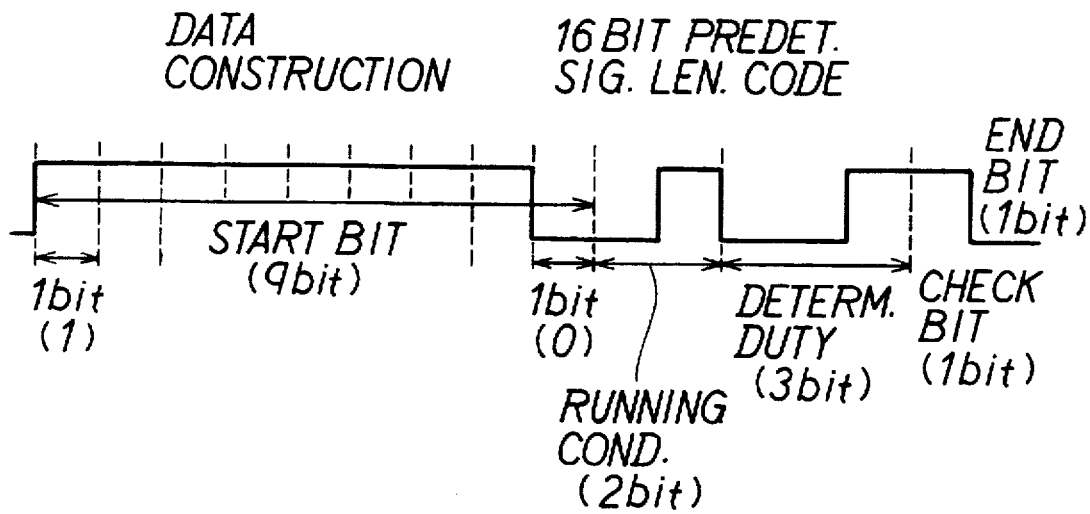
FIG. 3 illustrates a binary pulse train signal used for signal transmission by the apparatus shown in FIG. 1.
FIG. 4 is a code table showing the contents of binary data signals contained in the binary pulse train signal as shown in FIG. 3.

The engine control device 7 receives vehicle running signals indicating vehicle speed, engine speed, idle SW, transmission position, electric load and the condition when a key switch is closed, and determines the vehicle running conditions (idle, deceleration and other running conditions). The engine control device 7 sets a determination generating rate (determination Fduty) in accordance with the amount of electric load for the purpose of determining the charged state of the battery by the generating rate (Fduty) of the alternator during idling. These signals are modulated (converted) into binary pulse train signals by a vehicle condition signal output unit 71 as illustrated in FIG. 3, and then transmitted to the signal distinguishing unit 35 of the voltage control device 3. The signal distinguishing unit 35 decodes the binary pulse train signal received to extract a vehicle running condition signal and a determination generating rate. The vehicle running signal is transmitted to the generated voltage setting unit 33, and the determination generating rate is transmitted to the generating rate comparing unit 34.

Figure 2:
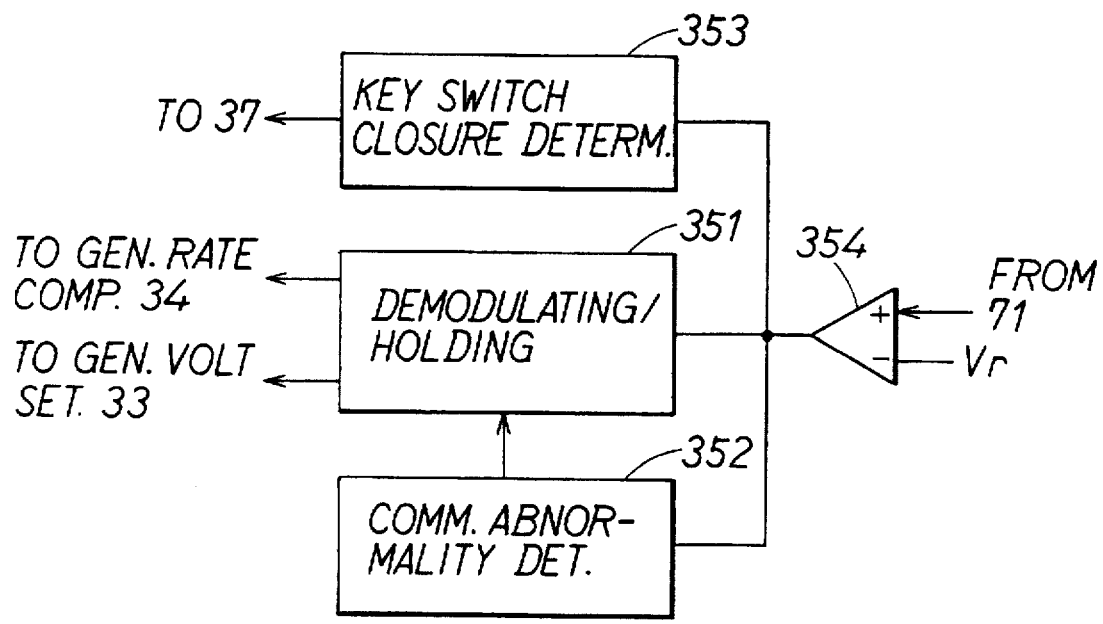
FIG. 2 is a block diagram of the signal determining unit shown in FIG. 1.

The construction of the signal distinguishing unit 35 will be described with a block diagram shown in FIG. 2.

The signal distinguishing unit 35 has a comparator 354 that forms the vehicle condition signal from the vehicle condition signal output unit 71 into a binary pulse signal. The binary pulse signal outputted from the comparator 354 is decoded by demodulating-holding unit 351 into a vehicle condition signal, that is, a running condition signal and a determination generating rate which are held thereby. The running condition signal is outputted to the generated voltage setting unit 33 and the generating rate comparing unit 34. The determination generating rate is outputted to the generating rate comparing unit 34.

The binary pulse signal is transmitted from the comparator 354 to a communication abnormality determining unit 352 for determining a communication abnormality and a key switch closure determining unit 353 for determining whether a key switch has been closed. The communication abnormality determining unit 352 outputs a communication abnormality determination signal to the demodulating-holding unit 351. The key switch closure determining unit 353 outputs to the power source circuit 37 the result of a determination on whether the key switch has been closed.

The construction of a binary pulse train signal from the vehicle condition signal output unit 71 will be described with reference to FIG. 3.

The binary pulse signal train is a 16-bit-long signal transmitted and received by a so-called asynchronous digital communication method. The binary pulse signal comprises: a start bit signal composed of a first 8-bit-long head pulse and a one-bit-long blank bit (low level) that follows; a vehicle running condition signal formed of a two-bit-long binary code arranged in the 10th and 11th bit positions; a determination generating rate signal formed of a 3-bit-long binary code arranged in the 12th to 14th bit positions; a one-bit-long check bit arranged in the 15th bit position; and a one-bit-long end bit of a blank bit (low level) arranged in the 16th bit position. The check bit is added for the parity check of the five bits of the data pulses. It is determined that the total number of binary pulses indicating logic level 1 among the five bits of the data pulses and the one bit of the check bit be always an odd number. Each bit is represented by a signal pulse that occurs at a regular cycle. The high and low levels of signal pulses correspond to 1 and 0, respectively. Signal pulses are serially outputted to the signal line L. FIG. 4 shows the content of data of a vehicle running condition signal and the content of data of a determination generating rate signal. Vehicle running signals and determination generating rate signals are data pulse signals.

Figure 5:
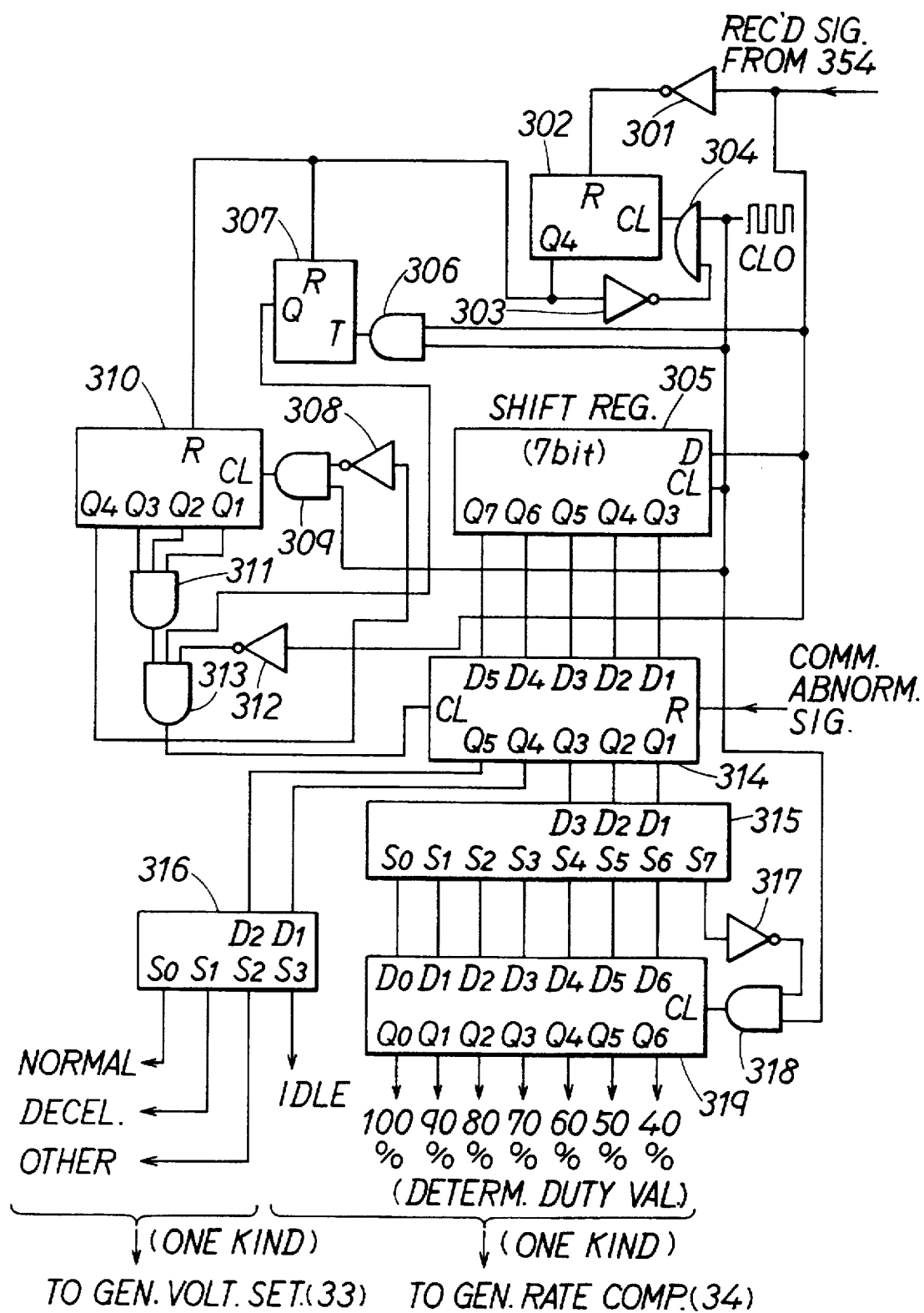
FIG. 5 is a circuit diagram of an example of the demodulating-holding unit shown in FIG. 2.

The demodulating-holding unit 351 will be described in detail with reference to FIG. 5.

The demodulating-holding unit 351 comprises a data extracting section for extracting data from the signals received, and a holding section for holding the content of data. The data extraction by the data extracting section is performed by reading the binary pulse signals that come at the 10th to 14th bit positions from the detection of the start bits.

When the signal from the comparator 354 becomes low, the start bit detecting counter 302 is reset. When a binary pulse signal is inputted (that is, when the input signal becomes high), the start bit detecting counter 302 is released from the resetting and starts counting clock signals CLO from a clock generator (not shown) to measure the pulse width of the binary pulse signal. If a terminal $Q_4$ of the counter 302 becomes high (if the pulse width is 8 bits long), that is, if it is determined that a head pulse has been inputted, the high level signal is converted to the low level by an inverter 303 to turn off an AND gate 304. The counter 302 suspends counting until a low level pulse is received. If the $Q_4$ terminal of the counter 302 becomes the high level (if input of a head pulse is determined), a data counter 310 and a signal check circuit (toggle flip-flop) 307 are reset.

A signal check circuit 307 adds up the high level occurrences with data pulses inputted thereto through the AND gate 306 every time the clock signal becomes high after a head pulse (start bits) is detected. The signal check circuit 307 outputs the high level if the number of occurrences of the high level with the pulses received after detection of the head pulse is an odd number, and outputs the low level if it is an even number.

Thus, the Q output of the signal check circuit (toggle flip-flop) 307 becomes high at the timing of input of the end bit signal that comes in the seventh input data place after detection of the start bits if normal signal transmission has been performed. If the Q output of the check circuit is at low, this means that an even number of low-to-high level transitions of binary pulse signals of data bits have occurred following the input of the start bits. Therefore, it is determined that the binary data signals (data bits) received are an error.

If the last bit is not at the low level, the low level is outputted through the inverter 312 to the AND gate 313, which causes the AND gate output to become 0 as an abnormality with the end bit.

The binary pulse signals (received signals) from the comparator 354 are serially stored in a 7-bit shift register 305 that constitutes a temporary latch section. That is, the shift register 305 takes in a received signal every time the clock signal CLO becomes high and shifts. The shift register thus stores binary pulse signals of the latest seven bits.

The 4-bit counter 310 counts the clock signals CLO through an AND gate 309 after the input of a head pulse has been determined ($Q_4$ is at the high level). When all the three bits of the lower order have become high, that is, at the end bit input timing, in other words, at the timing when the transmission period for the binary data signals (data bits) and the check bit has been checked by an AND gate 311, the AND gate 311 instructs a 5-bit latch 314 to take in signals, via another AND gate 313 that opens only when the aforementioned parity check has confirmed normal reception. The latch 314 thus latches the higher five bits stored in the shift register 305, that is, a 5-bit binary data signal.

A decoder 316 decodes the higher two bits of the latched 5-bit binary data signal, that is, a vehicle running condition signal, into a normal generation signal, a deceleration signal, an idle signal, or other signals, which is then transferred to the generated voltage setting unit 33 and the generating rate unit 34. A decoder 319 decodes the lower three bits of the latched 5-bit binary data signal, that is, a for-determination generating rate signal, into a for-determination generating rate (for-determination Fduty), which is then latched by a latch 319 and transferred to the generating rate comparing unit 34. The state $S_7$ where all the lower three bits of the two binary data signal are 1 is a redundant state that is never transmitted. If the state $S_7$ becomes high, an inverter 317 and an AND gate 318 operate to stop the rewriting of the latch 319, thereby performing generation control by using the for-determination generating rate previously latched until the next reception.

To summarize, if the end bit is low and if the check circuit 307 does not determine that there is an error after the number of data has reached a level of one single piece of data, a latch instruction is generated. The latch circuit 314 then latches the content of the five bits of the binary data signal obtained by removing the check bit and the end bit from the content of the shift register 305 at the rising of a latch signal. The operation until the latching occurs is illustrated in FIGS. 6A–6J.

As indicated in FIGS. 6A–6J, if an interruption of transmission signals occurs, the high level of the start bits is inputted before input of the low level of the end bit. Therefore, the AND gate 313 outputs the low level to the latch 314 so that the latch 314 does not update the data.

Figure 7:
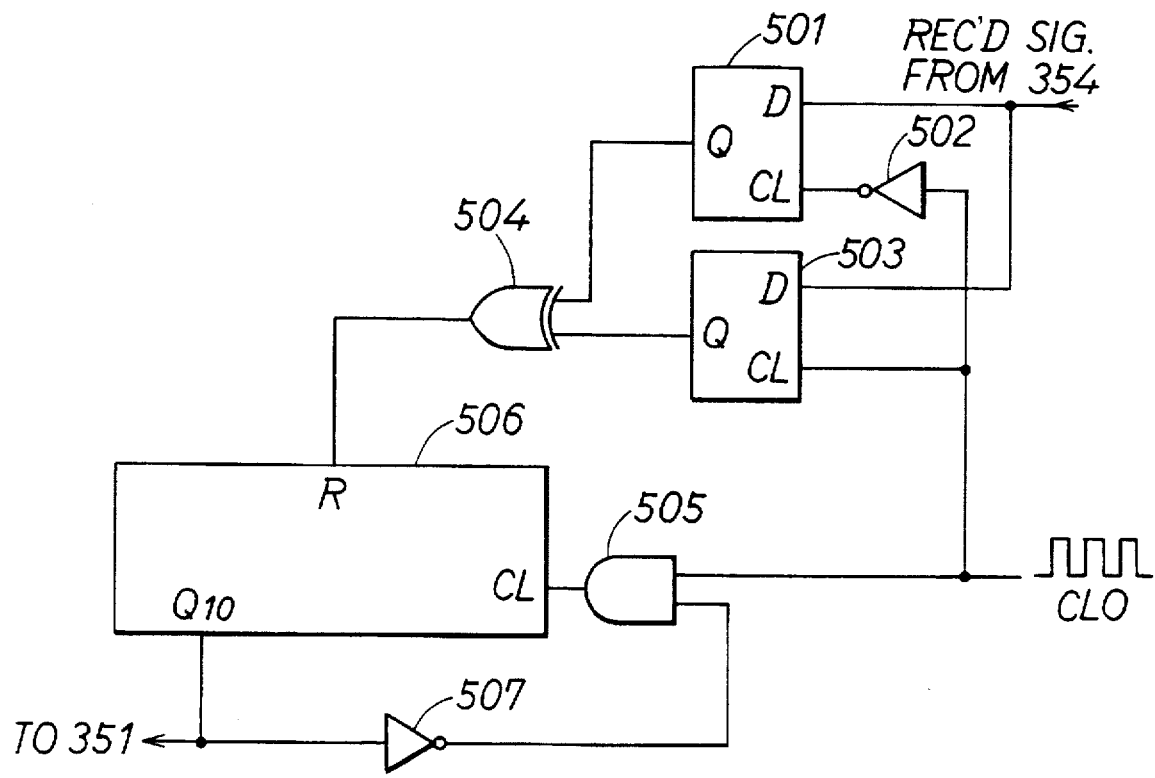
FIG. 7 is a circuit diagram illustrating an example of operation of the communication abnormality determining unit shown in FIG. 2.

Communication abnormality determining unit 352 will be described with reference to FIG. 7.

The communication abnormality determining unit 352 stops control when detecting a communication failure caused by disconnection of the communication line L or the like. If the comparator 354 continues to receive the low level or the high level for a long time, the communication abnormality determining unit 352 determines that external communications have stopped, and thus stops the external power generation control using vehicle condition signals from the vehicle condition signal output unit 71 and shifts the control to normal generation mode (internal control mode).

According to this embodiment, the ECU 7 outputs a change in the level of a binary signal or a binary pulse signal at least once within a predetermined length of time.

More specifically, a D flip-flop 501 latches the level of a received signal from the comparator 354 every time the clock signal CLO becomes low. A D flip-flop 503 latches the level of a received signal from the comparator 354 every time the clock signal CLO becomes high. The Q outputs from the flip-flops are checked for their inequality by an exclusive-OR circuit 504. If inequality is detected, the exclusive-OR circuit 504 resets a counter 506. That is, if the received signal does not change, the Q outputs from the flip-flops 501, 503 are equal, and if the received signal changes, the exclusive-OR circuit 504 resets the counter 506.

After being reset, the counter 506 counts the clock signals CLO. If the tenth bit of the counter, the Q output $Q_{10}$, becomes the high level (if the received signal makes no change for that period), the communication abnormality determining unit 352 determines that an abnormality has occurred in the communication line L or the like, and instructs the latch 314 to reset. As a result, the decoder 316 instructs normal generation. If normal generation is instructed, the generated voltage setting unit 33 performs normal generation as described later.

In short, since the electric potential of the communication line L is fixed to either the high or low level when the line L is disconnected, a long-term level fixation of the received signal occurs, which causes the output of the counter 506 to become high. An abnormality signal is thus transmitted to the latch 314.

The key switch closure determining unit 353 will be described with reference FIG. 8.

According to the conventional art, since electricity is supplied directly to the regulator 3 via the ignition switch, a specific harness is required. Alternatively, since a key switch closure signal is transferred to the regulator 3 via the ignition switch and a charge lamp and electricity is supplied from another terminal, key switch closure cannot be detected if the charge lamp is blown out.

The key switch closure signal transmission method according to this embodiment as described below will eliminate the need for a specific harness and enables unfailing detection of key switch closure even if the charge lamp is blown out.

For the regulator 3 to receive a key switch closure signal, a key switch closure signal indicating the closure or opening of the key switch needs to be transmitted from the external control device 7 to the regulator 3.

According to this embodiment, the key switch closure signal is convoluted with the start bit signal (head pulses) for transmission in order to reduce the required bit length of binary pulse signals. The key switch closure transmission method will be described with reference to FIG. 8.

Figure 8:
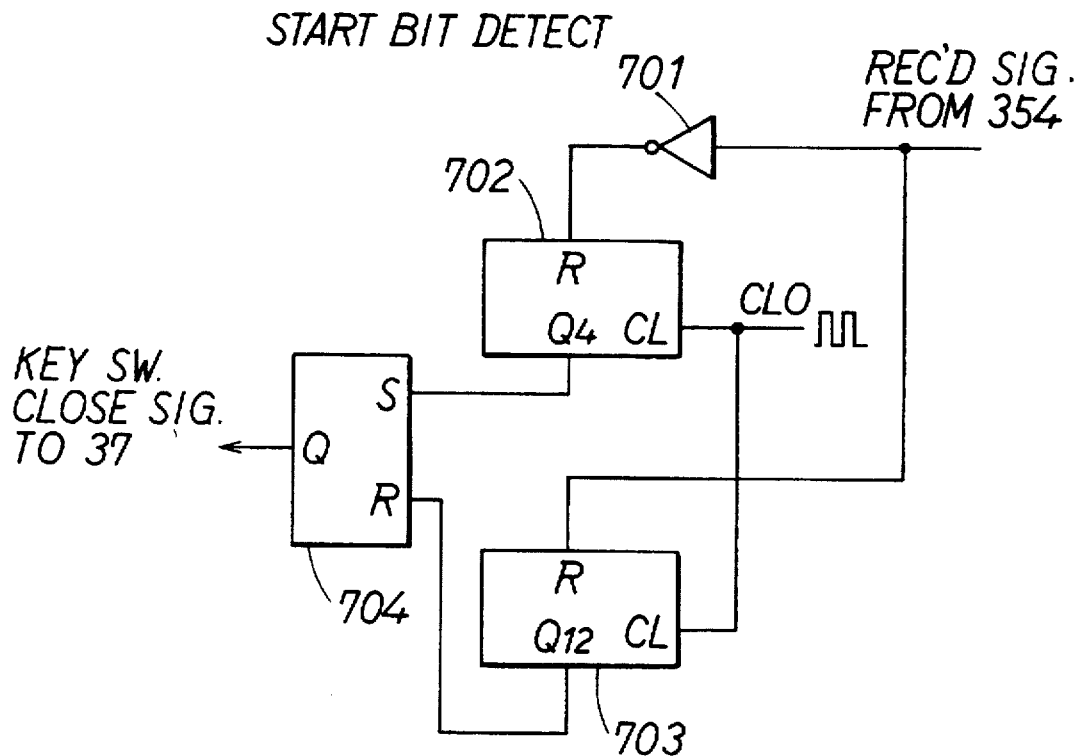
FIG. 8 is a circuit diagram illustrating an example of the key switch closure determining unit shown in FIG. 2.

Referring to FIG. 8, a 4-bit counter 702 detects head pulses as in the counter 302. When head pulses are detected, which means that the key switch has been closed, a flip-flop 704 then outputs a high level signal. If the received pulse level does not become high before the 12th output $Q_{12}$ of a 12-bit counter 703 for counting clock signals CLO becomes high, the counter 703 resets the flip-flop 704 and outputs a signal indicating that the key switch has been disconnected (the output of the flip-flop 704 is low) to the power source circuit 37.

This method thus enables determination on whether the key switch has been closed without requiring insertion of a key switch closure signal into the binary pulse train signal.

Another example of the key switch closure determining unit 353 will be described with reference to FIG. 9. Normally, this example determines whether the key switch has been closed, by detecting energization of the external control device 7, since the external control device 7 operates only when the key switch is closed.

Figure 9:
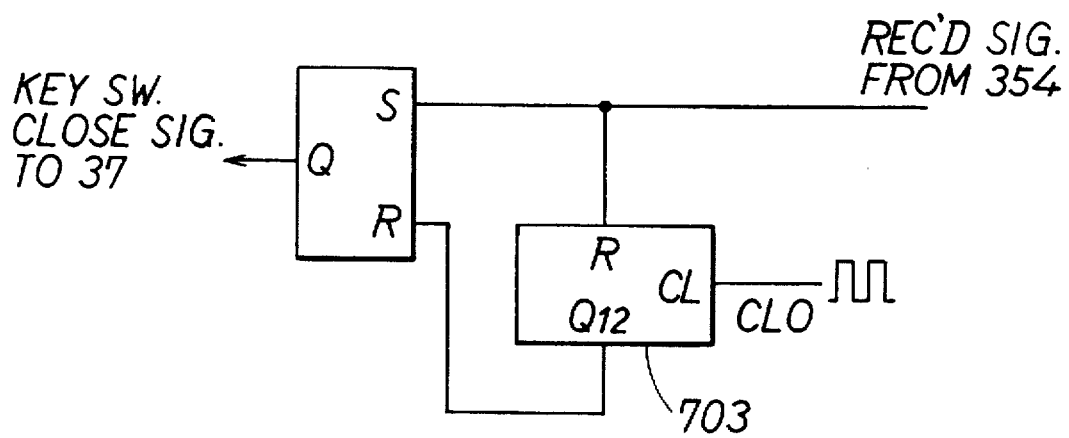
FIG. 9 is a circuit diagram illustrating another example of the key switch closure determining unit shown in FIG. 2.

More specifically, referring to FIG. 9, the flip-flop 704 determines that the key switch has been closed if the signal from the comparator 354 becomes high, and then outputs the high level. The counter 703 counts the clock signals CLO. If a next received pulse (high level) is inputted before the count value reaches a pre-set value Q12, it is determined that the key switch is closed. If no received pulse (high level) is inputted before the pre-set value Q12 is reached after the high level of the previous signal has been received, it is determined that the key switch is disconnected.

According to this embodiment, the external control device 7 outputs to the communication line L the high level of the binary pulse signal at a cycle that is shorter than the pre-set value Q12 during energization, and outputs the low level when the energization is stopped.

This method enables determination on whether the key switch has been closed, without requiring a complicated construction nor elongation of the bit length of binary pulse train signals.

If the regulator 3 employing the arrangement as illustrated in FIG. 8 or 9 is not connected to the external control device 7 by the communication line L, an external communication terminal LL (see FIG. 1) may be connected to an end of the key switch, simply as a key switch closure detection terminal.

If the communication line L is disconnected, the circuits shown in FIG. 8 and 9 will mistakenly determine that the key switch has been disconnected, thus stopping power generation. To prevent this drawback, it is necessary to design a circuit such that generated voltage is detected and, while power is being generated, the power generation is continued even if key switch closure is detected. That is, if the key switch is actually disconnected, the engine will stop and therefore the power generation will stop. This drawback can be prevented by a circuit arrangement that stops the power generation control only when the generated voltage monitored drops to a predetermined value or lower and the key switch closure signal indicates disconnection of the key switch. In addition, if it is determined that the key switch has been disconnected but power generation continues, it is considered that a communication abnormality has occurred as mentioned above, and the power generation control is performed by the normal power generation mode.

Figure 10:
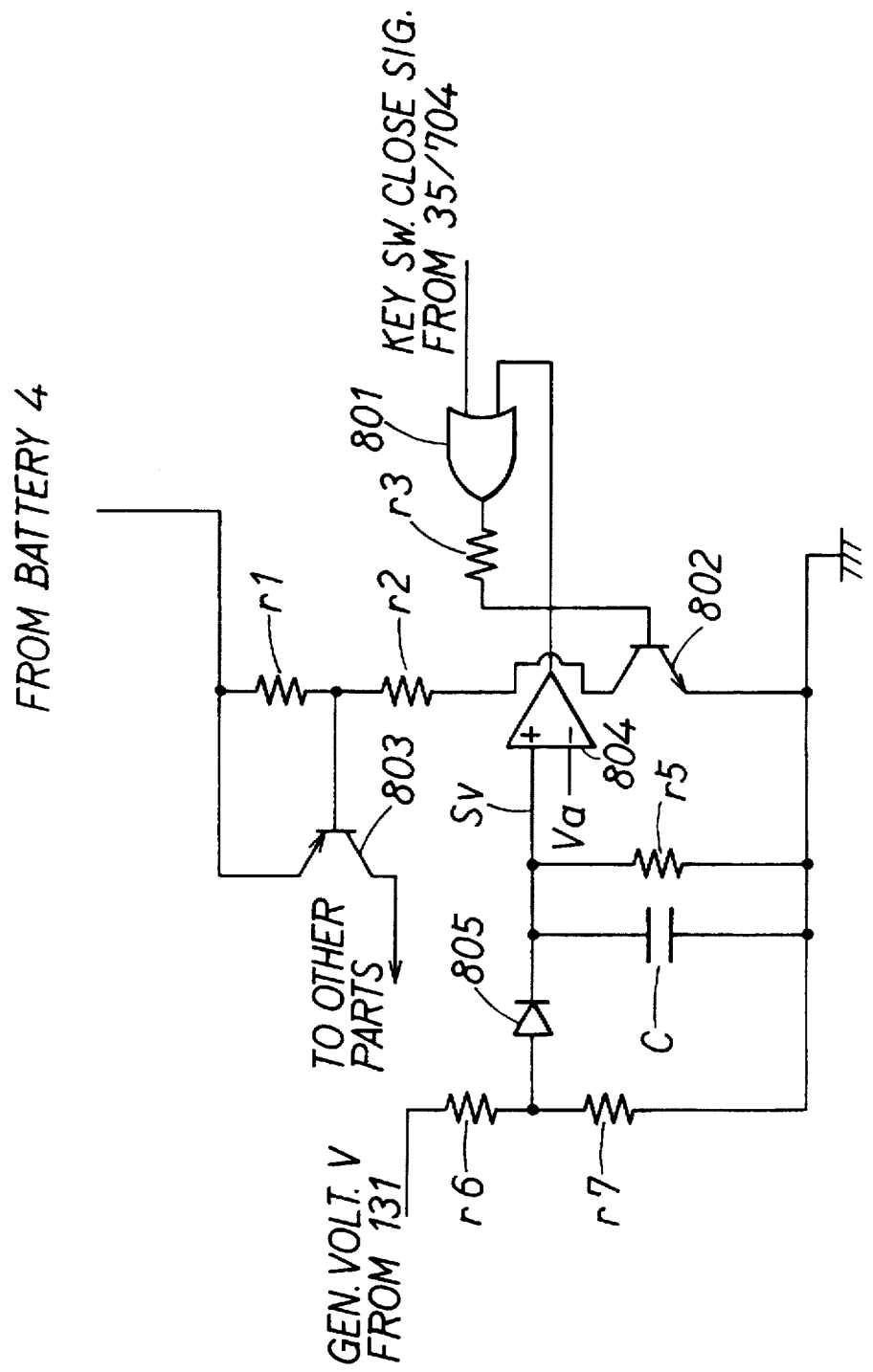
FIG. 10 is a circuit diagram of the power source circuit shown in FIG. 1.

The circuitry and operation of the power source 37 will be described with reference to FIG. 10.

If the key switch closure signal from the circuit 704 is at the high level (if the key switch has been closed), the high level is transmitted through an OR circuit 801 and a current limiting resistor r3 to cause a transistor 802 to turn on. Current is thereby supplied through resistors r1, r2. A drop of the voltage across the resistor r1 caused by the current turns on the transistor 803, which then supplies electricity to various units.

The generated voltage V outputted from a single-phase AC input terminal of the three-phase full-wave rectifier 13 is divided by a voltage divider circuit comprising resistors r6 and r7, and then rectified by a diode 805, smoothed by a capacitor C and smoothed by a resistor r5 to become a DC generated voltage signal Sv, which is compared with a reference voltage Va by a comparator 804. If the DC generated voltage signal Sv is greater than the reference voltage Va, the transistor 802 is turned on through the OR circuit 801 and the current limiting resistor r3. Thus, if the key switch closure signal becomes low while the output of the comparator 804 is high, the transistor 803 is turned on to energize various units.

The power source circuit stops energizing various parts of the regulator 3 to stop the power generation control if the key switch closure signal becomes low and it can be considered that the power generation has stopped. The above-stated advantages are thus achieved.

Figure 11:
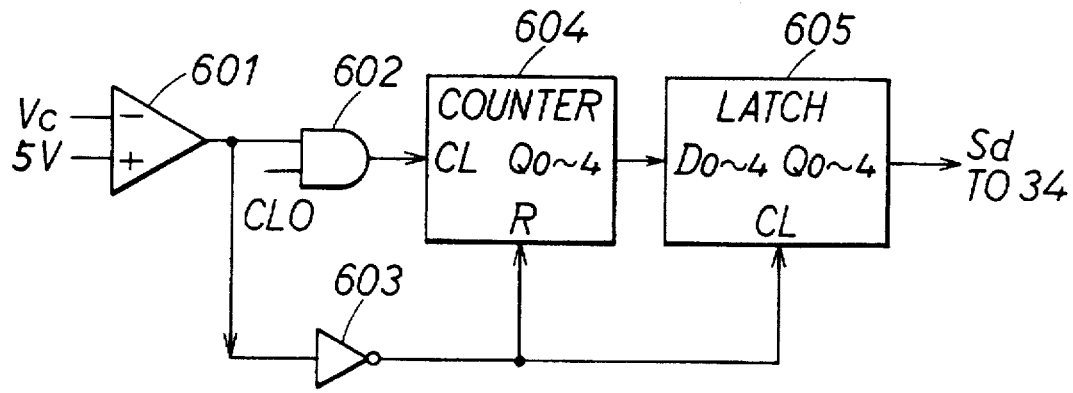
FIG. 11 is a circuit diagram of the generating rate determining unit shown in FIG. 1.

An example of the power generating rate determining unit 36 will be described with reference to FIG. 11.

A comparator 601 compares the collector voltage Vc of the switching transistor 31 with a reference voltage (5 V). If the comparator 601 outputs a low level signal, it is determined that the switching transistor 31 is turned off and that it is in the non-power generation period. In this case, a counter 604 is reset by an output from an inverter 603.

Then, while the comparator 601 is outputting the high level (while the switching transistor 31 is on), the counter 604 counts the clock signals CLO. When the comparator 601 outputs the low level, the count value is latched by a latch 605 using an output from the inverter 603. A power generation period is detected and outputted as a power generating rate.

Figure 12:
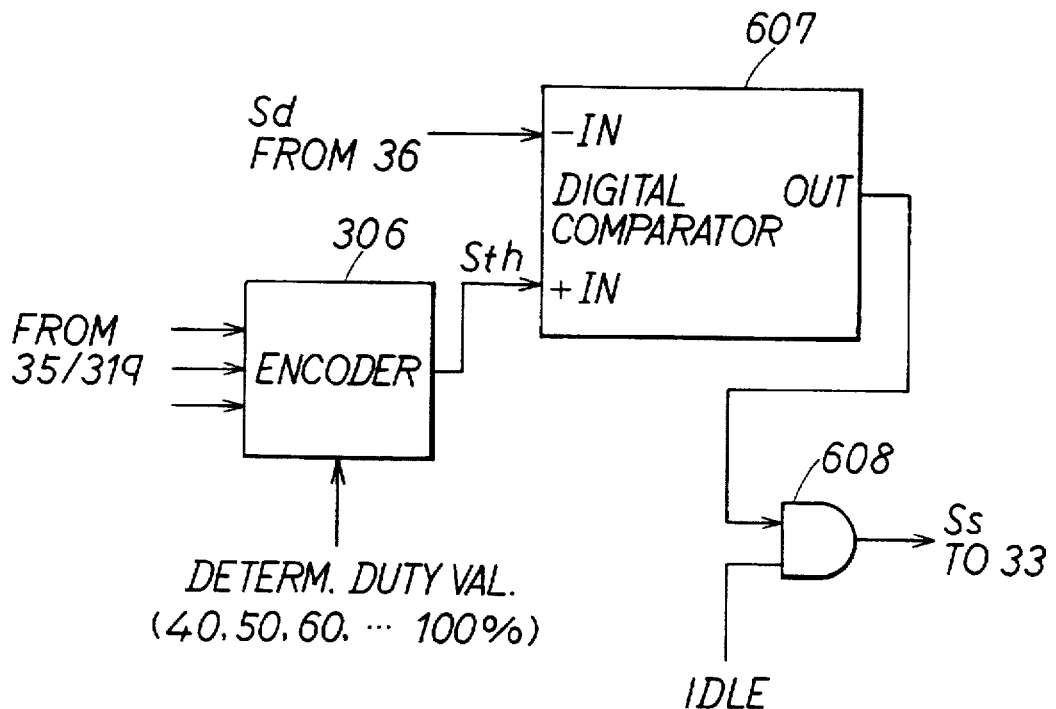
FIG. 12 is a circuit diagram of the generating rate comparing unit shown in FIG. 1.

An example of the power generating rate comparing unit 34 will be described with reference to FIG. 12.

A for-determination generating rate (for-determination duty value), that is, a plurality of parallel binary signals from the latch 319 (see FIG. 5), is converted into digital generating rate signals which are inputted as a threshold value (target generating rate) Sth into a digital comparator 607. The digital comparator 607 compares the threshold and a determined digital generating rate signal Sd. If Sd is smaller (if the power generation level is low), the comparator 607 outputs the high level to an AND gate 608.

Thus, the output from the digital comparator 607 indicates the state of the battery capacity. That is, if the battery capacity is large, the output from the digital comparator 607 becomes low. If the battery capacity is small, the output from the digital comparator 607 becomes high.

Figure 13:
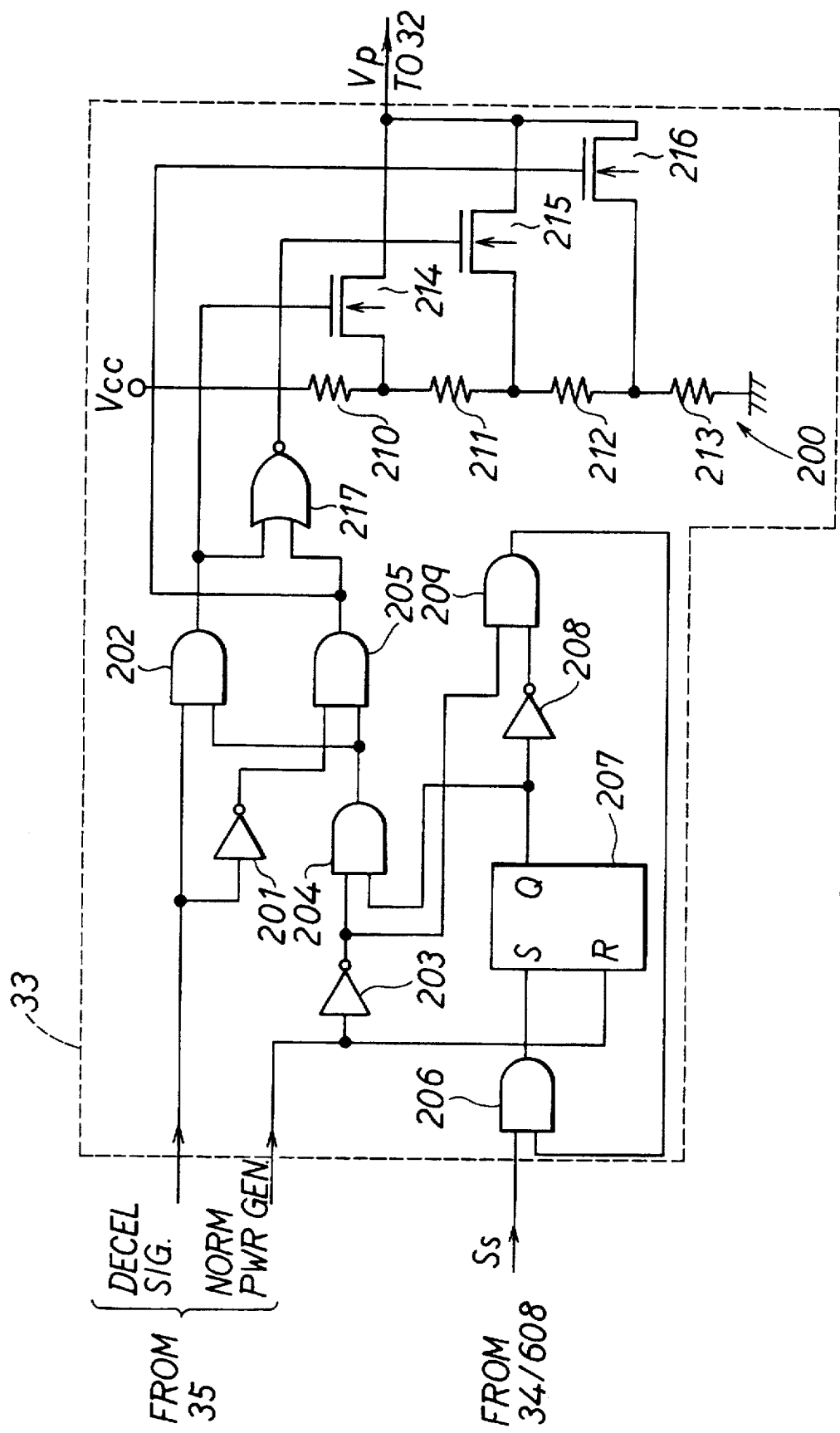
FIG. 13 is a circuit diagram of the generated voltage setting unit shown in FIG. 1.

The AND gate 608 outputs the high level as a target generated voltage reduction permission signal Ss to the AND gate 206 (see FIG. 13) if the digital comparator 607 outputs the high level while the idle signal from the latch 316 (see FIG. 5) is at the high level (which indicates idling of the engine).

The generated voltage setting unit 33 controls the switching of target generated voltage values Vp by using a normal generation signal indicating the normal power generation and a deceleration signal indicating the vehicle decelerating condition, which are vehicle running condition signals inputted, and the target generated voltage reduction permission signal Ss.

If an idle signal is being outputted and the determined generating rate is lower than the target generating rate (the battery charge is sufficiently large), a flip-flop 207 is set to the high level. Since the normal power generation signal and the deceleration signal are at the low level at this moment, an inverter 203 and an AND gate 204 go to the high level, and an inverter 208 and an AND gate 209 become the low level and an AND gate 206 is closed. An AND gate 202 becomes the low level, an AND gate 205 becomes high, and a NOR gate 217 becomes low. As a result, only a MOST 216 is turned on so that a voltage divider circuit 200 outputs to the comparator 32 the lowest value as a target generated voltage. Thereby, the generator load relative to the engine is reduced, thus reducing fuel consumption.

After that, if another vehicle running condition signal is received, the AND gate 206 becomes low and the other elements remain unchanged, thus outputting a low value as a target generated voltage.

If a deceleration signal is inputted, the AND gate 202 becomes the high level and the AND gate 205 becomes low since the flip-flop 207 and the AND gate 204 have been high. As a result, only a MOST 214 is turned on so that the highest value as a target generated voltage is outputted to the comparator 32. The generator load relative to the engine is increased to increase the braking force (engine brake) and the battery charge.

Then, if a normal generation signal is inputted, the AND gate 206 outputs the low level; the flip-flop 207 is reset; the AND gates 202, 205 become low; and the NOR gate 217 becomes high. As a result, only a MOST 215 is turned on so that the voltage divider circuit 200 outputs a normal intermediate value as a target generated voltage to the comparator 32. After the transition from the idle state to the normal generating state, the flip-flop 207 outputs the low level. After that, the target generated voltage from the comparator 32 remains at the intermediate value regardless of the kind of running signals received until the flip-flop 207 is set again by the output from the AND gate 206.

The aforementioned normal generation signal is outputted from the ECU 7 in a case, for example, where a large electric load is driven, as well as in a case where the regulator determines that a communication abnormality has occurred.

A second preferred embodiment of the present invention will be described with reference to FIG. 14.

According to this embodiment, the binary pulse train signal according to the first embodiment shown in FIG. 3 is changed. The binary pulse train signal according to this embodiment comprises a 5-bit-long start bit signal composed of a 4-bit-long head pulse and the following one-bit-long blank bit; a vehicle running condition signal composed of two bits that follow; a for-determination generating rate signal composed of three bits that follow; and a parity check signal bit (check bit) of one bit that follows, as illustrated in FIG. 14.

According to this embodiment, the 0 level of binary signals (also referred to as "binary pulse signal" in this specification) of running condition signals and for-determination generating rate signals is expressed by the high level of a one-bit-long binary pulse signal, and the 1 level thereof is expressed by the high level of a two-bit-long binary signal. One-bit-long blank bits, that is, the low level of one bit length, are provided between binary signals as a pulse width for separating the binary signals.

Thus, this embodiment differs from the first embodiment only in the construction of a unit for demodulating and holding the contents of reception. The demodulating-holding unit according to this embodiment will be described with reference to FIG. 16.

Figure 16:
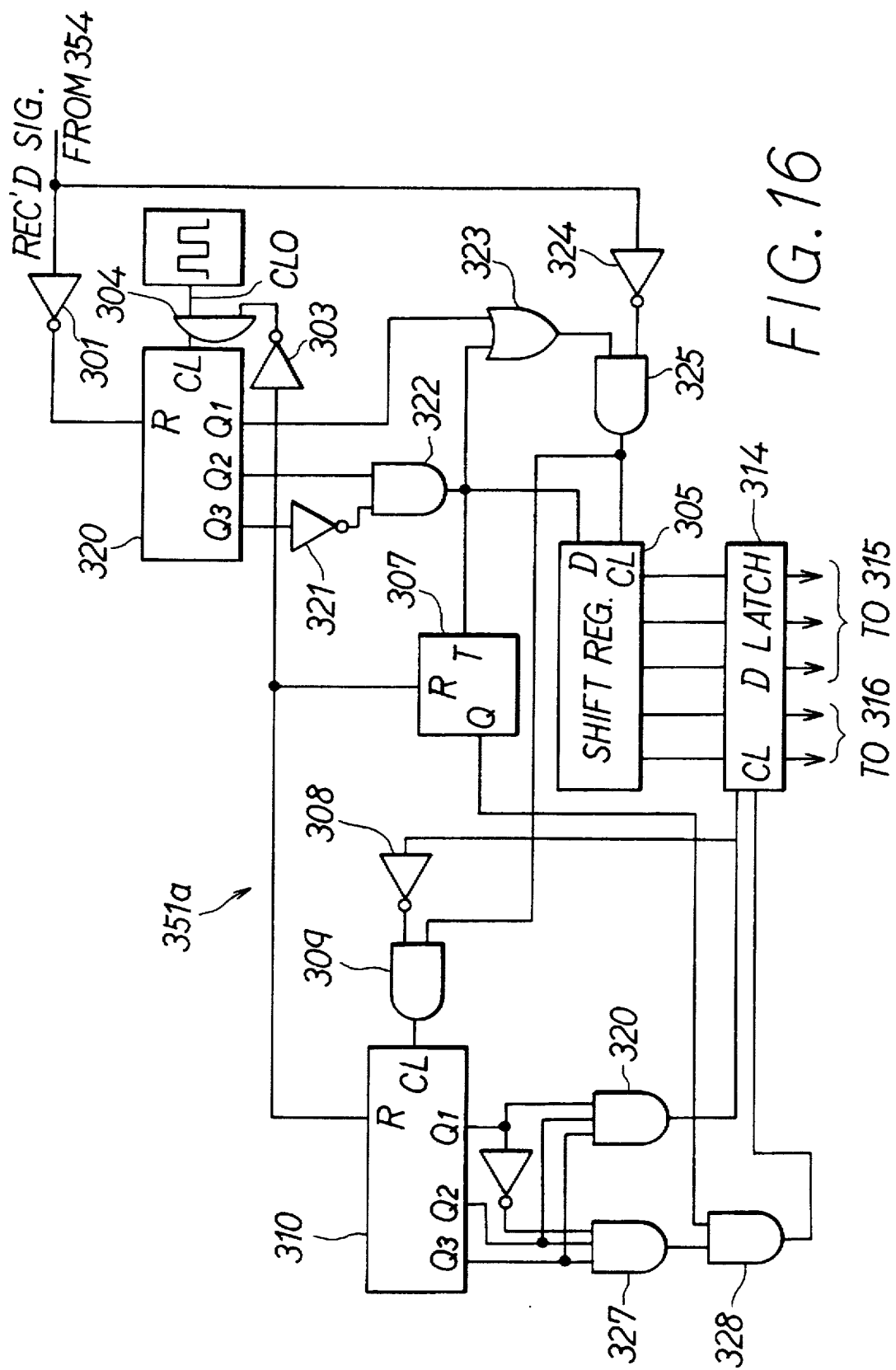
FIG. 16 is a circuit diagram of an example of the demodulating-holding unit according to the second embodiment.

Demodulating-holding unit 351a shown in FIG. 16 differs from the demodulating-holding unit 351 according to the first embodiment (see FIG. 5) in that 0-or-1 determination regarding data pulses is performed by a signal length counter and, accordingly, no end bit is needed for detecting an interruption. Mainly, the differences will be described.

Figure 15:
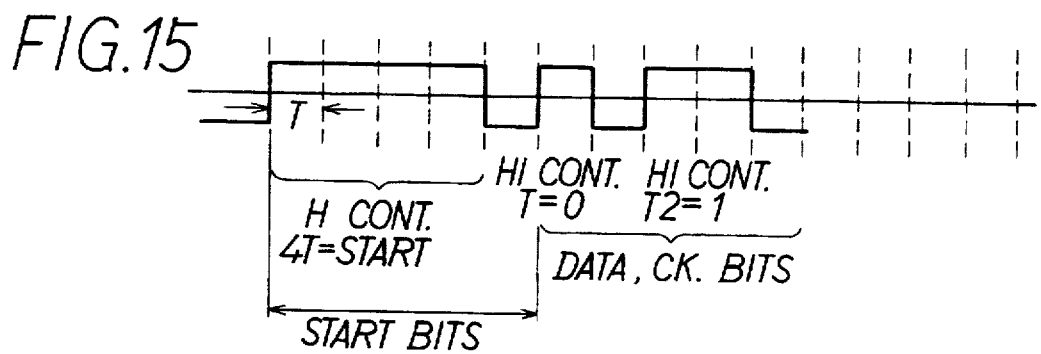
FIG. 15 illustrates an example of the binary pulse train signal shown in FIG. 14.

A counter 320 for counting a pulse width is reset by the low level of a received signal. A start bit signal is detected by the transition of the $Q_3$ output of the counter 320 to the high level. Then, the counter 320 counts pulses received, and an AND gate 322 outputs the high level if a received pulse width is 2T (010 in three-bit binary code), that is, if the width of a pulse received is a width of 2T indicating binary signal level 1, and outputs the low level if a received pulse width is 1T, that is, if the width of a pulse received is a width of 1T indicating binary signal level 0. T is a time length of one bit (see FIG. 15).

On the other hand, an AND gate 325 for determining the reading timing of a shift register 305 instructs the shift register 305 to read in if an OR circuit 323 outputs the high level at the falling of a received signal specified by an inverter 324. The OR circuit 323 outputs the high level when a pulse of 1T width is inputted since the input from Q1 becomes the high level in such an occasion, and outputs the high level when a pulse of 2T width is inputted since the input from an AND gate 322 becomes the high level. Thus, input to the shift register is performed at the falling of every pulse received. As for the content of input, the high level is written into the shift register 305 if a pulse of 2T width is received since the AND gate 322 becomes the high level, and the low level is written into the shift register 305 if a pulse of 1T width is received since the AND gate 322 becomes low.

A counter 310 counts received pulses at the falling of every received pulse inputted through an AND gate 309 from the AND gate 325. An AND gate 327 determines that reception of a binary pulse train signal is completed if the number of pulses after detection of the start bits reaches six. that is, two pulses of a running condition signal, three pulses of a for-determination generating rate and one pulse of a check bit have all been inputted. Then, an AND gate 328 stores the 5-bit binary data signal from the shift register 305 into a latch 314 if a parity check signal from a toggle flip-flop 307 is normal (high level).

If a false data pulse caused by noise, for example, is received after transmission of data but before the next transmission starts, pulses in the form of binary data pulses are inputted without start bits inputted and, therefore, the counter 310 outputs a large number 111. Then, the AND gate 320 becomes the high level to turn off an AND gate 309 by means of an inverter 308 so that the counter 310 rests until it is reset by the input of the next start bits.

If an interruption is caused, the counter 310 detects start bits before it determines that the number of pulses received have become six. The counter 310 is thus reset; the AND gates 327, 328 become low; and the latch 314 does not update the data.

Figure 17:
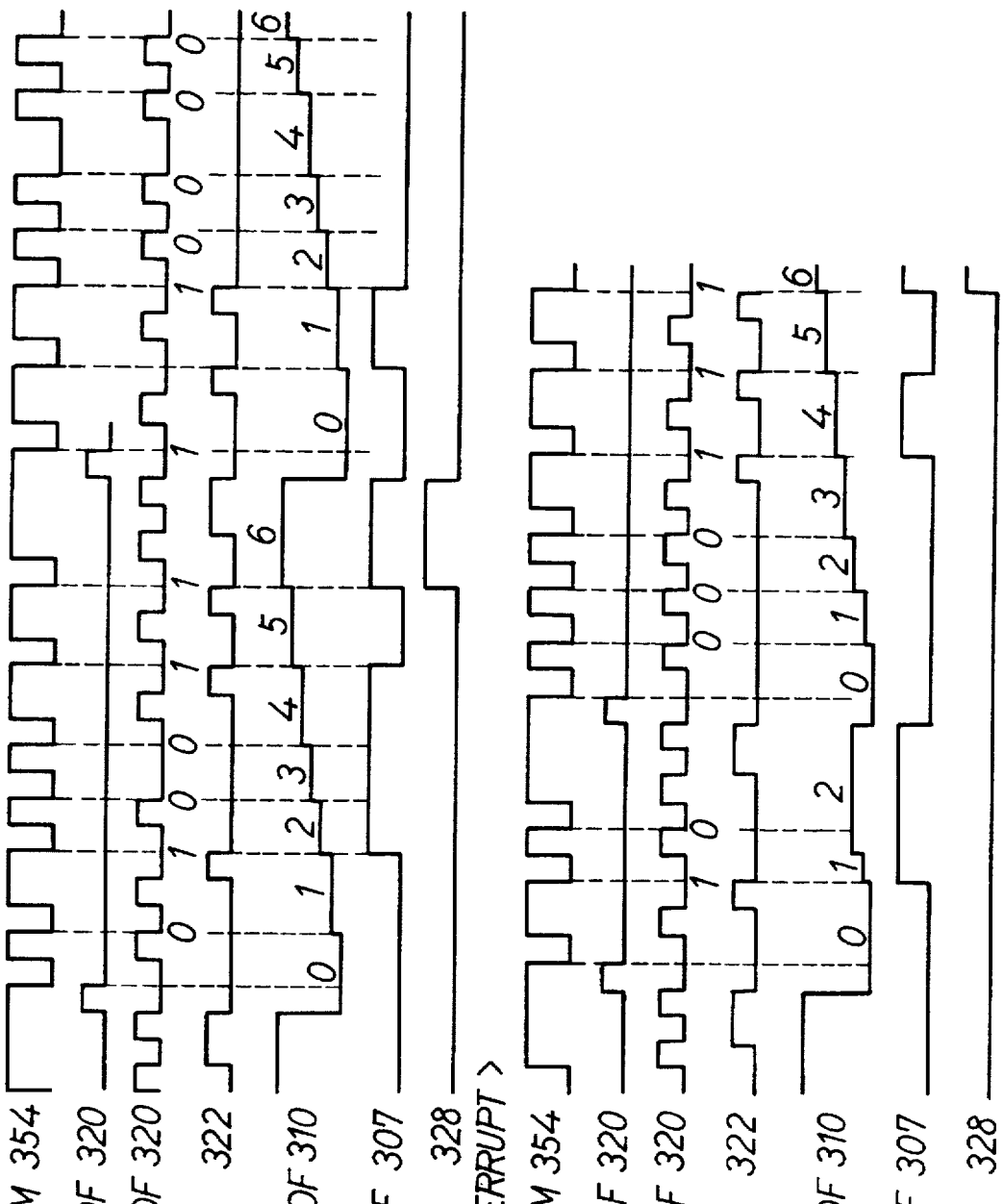
FIGS. 17A–17N are timing charts illustrating the signal status of various portions of the demodulating-holding unit shown in FIG. 16.

FIGS. 17A–17N show the voltage levels of various parts of the circuit shown in FIG. 16.

Still another embodiment will be described with reference to FIG. 18.

According to this embodiment, the binary pulse train signal according to the first embodiment shown in FIG. 3 is changed. The binary pulse train signal according to this embodiment is a variable length data signal as illustrated in FIG. 18. A binary pulse train signal according to this embodiment comprises a 9-bit-long start bit signal composed of a 8-bit-long head pulse and the following one-bit-long blank bit; a binary data signal composed of one to three bits that follow; a check bit signal composed of a one-bit-long parity check pulse and a one-bit-long blank bit that follows; and an end bit signal composed of a one-bit-long end pulse and a 4-bit-long blank bit signal that follows. Each binary data signal is followed by a one-bit-long blank bit (pulse width).

Figures 18, 19:
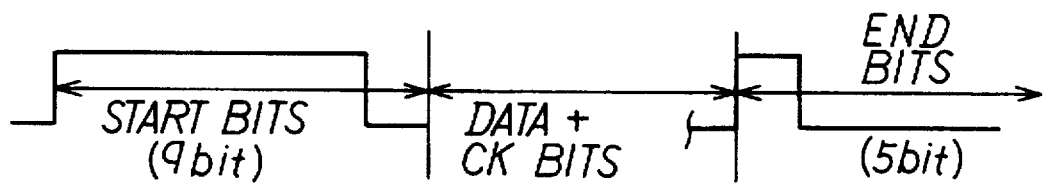
FIG. 18 illustrates a binary pulse train signal used for signal transmission in a third preferred embodiment of the present invention.
FIG. 19 is a code table showing the contents of binary data signals contained in the binary pulse train signal as shown in FIG. 18.

The indications of 1-to-3 bit binary data signals are shown in FIG. 19.

Thus, this embodiment differs from the first embodiment only in the construction of a unit for demodulating and holding the contents of reception. The demodulating-holding unit according to this embodiment will be described with reference to FIG. 20.

Figure 20:
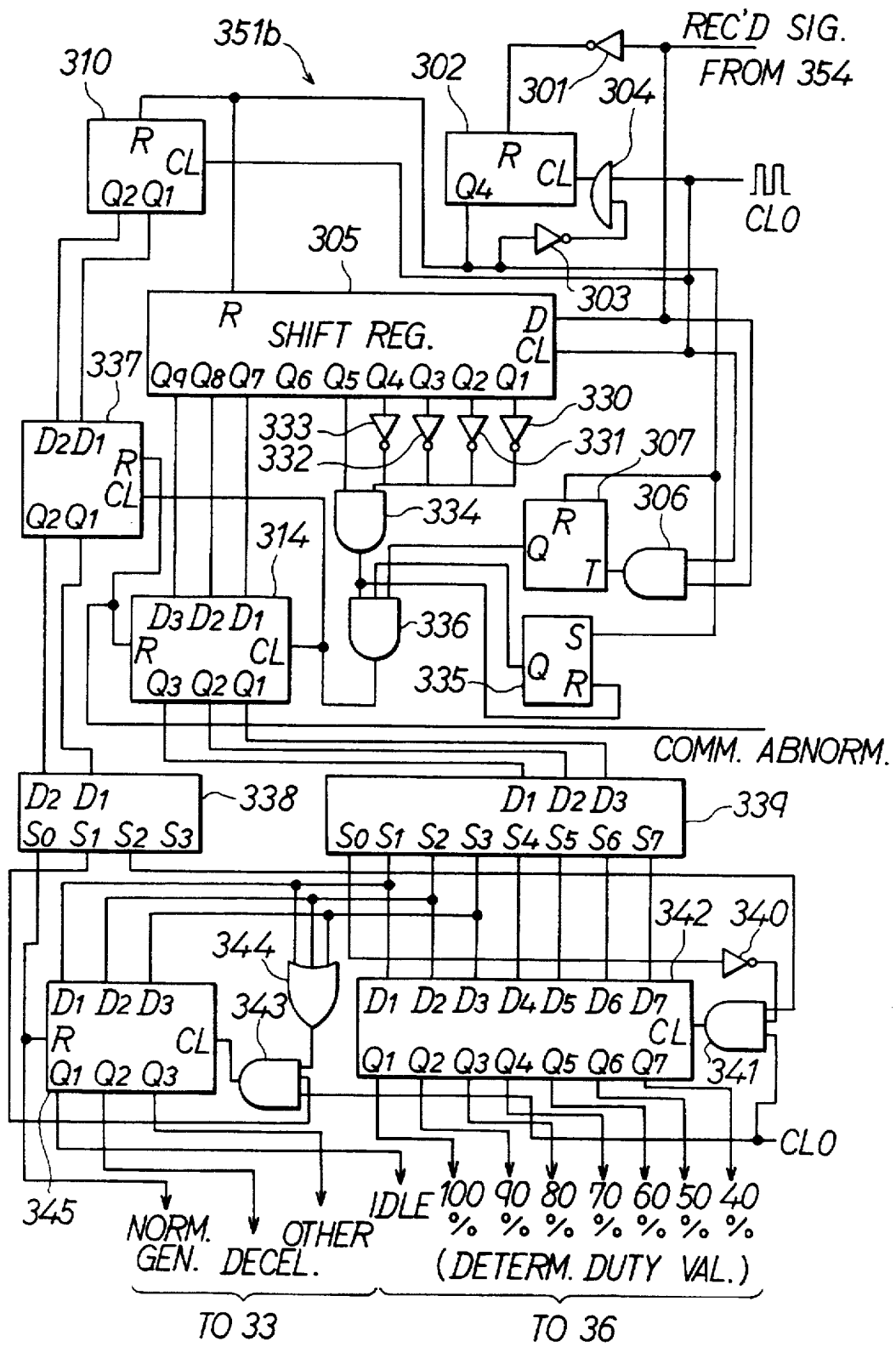
FIG. 20 is a circuit diagram of an example of the demodulating-holding unit according to the third embodiment.

Demodulating-holding unit 351b shown in FIG. 20 differs from the demodulating-holding unit 351 according to the first embodiment (see FIG. 5) mainly in that an end bit signal is detected to determine that transmission is completed. Mainly, the differences will be described.

When a start bit detecting counter 302 detects a start bit signal, it resets a data counter 310, a check circuit 307, and a shift register 305 of a signal temporarily holding section, and sets an RS flip-flop 335.

The shift register 305 stores the contents of signals received after the reception of the start bits, every time a clock pulse rises. The 4-bit data counter 310 counts clock pulses after reception of the start bits to detect bit time elapses after the reception of the start bits. The check circuit 307 performs parity check on the number of incidences where a binary signal is at the high level (the number of pulses).

When the tailing 5 bits of the shift register 305 becomes a pulse train (10000) the same as the end bits, an AND gate 334 for detecting end bits outputs the high level. If the Q output of the check circuit 307 is the low level at this moment, this means that an abnormality has occurred. In such a case, the check circuit 307 turns an AND gate 366 to the low level.

The AND gate 336 instructs latches 314, 337 to read in data at the time of detection of end bits only if the output of the check circuit 307 and the output of the flip-flop 335 are high. The latch 314 latches the higher three bits of the shift register 305 excluding the lower six bits (that is, the information in the bit position of a three-bit data pulse), and the latch 337 latches the lower 2 bit output from the data counter 310.

The latch 310 counts the elapsed time after reception of the start bits. The status of the lower two bits of the latch 310 differs depending of the number of bits of the data signal, that is, one bit, two bits or three bits. Therefore, if the status of the lower two bits of the counter 310 are inputted into a latch 337 at the time of reception of an end pulse when the AND gate becomes high, it means that the number of data bits is inputted to the latch 337. That is, if the number of data bits is 2, the lower two bits of the binary number of 8=2+6, that is, 00, are stored. If the number of data bits is 1, the lower two bits of the binary number of 7=1+6, that is, 11, are stored. If the number of data bits is 3, the lower bits of the binary number of 9=3+6, that is 01, are stored.

If $S_0$ of a decoder 338 is high (the data bit number=1), normal power generation is instructed to the generated voltage setting unit 33 as shown in FIG. 19 so that the generated voltage setting unit 33 performs predetermined power generation control. If the communication abnormality determining unit 352 determines that a communication abnormality has occurred, the latch 337 is reset and the latched content 00 is decoded into normal power generation by the decoder 338.

If $S_1$ of the decoder 338 is high (the data bit number=2), a latch 345 latches from a decoder 339 three kinds of decode contents of the lower two bits inputted therein, at the timing of rising of a clock CLO. Reference numeral 344 denotes an OR gate for preventing the aforementioned latching if the lower two bits inputted into the decoder 399 are 00.

If $S_2$ of the decoder 338 is high (the data bit number =3), a latch 342 latches three bits inputted therein, at the timing of rising of a clock CLO. Reference numeral 340 denotes an inverter that outputs the low level to an AND gate 341 if the three bits of the decoder 339 are 000, which are abnormal output, to prevent the latch 342 from reading.

If a communication abnormality occurs, the latch 314 is reset; the $S_0$ of the decoder 339 becomes the high level; and the latch 342 does not latch from the decoder 339.

FIGS. 21A–21G show the status of various parts at the time of reception, and FIG. 19 shows the number of data bits and the status of data and the contents of data.

According to this embodiment, if the data bit number is 1 or 2, the vehicle running alone is updated. If the data bit number is 3, the held content of for-determination Fduty alone is updated.

If an interruption occurs, no latch pulse is generated since a start bit signal is detected before an end bit signal is inputted. Since no latch signal is generated if a signal identical to the end bit signal is generated in an occasion other than signal transmission, caused by noise, for example, noise, the reading by the latches 314, 337 is performed only if the transmission status determining circuit (RS flip-flop) 335, which is set by the start bit signal and reset by the end bit signal, outputs the high level. Thus, the output of the AND gate 336 is maintained at the low level and no latch signal is generated unless a start bit signal occurs.

The RS flip-flop signal 335 becomes high at the time of detection of start bits, and becomes low at the time of detection of end bits, and outputs the high level during transmission of data bits and check bits. The AND gate 336 inhibits the latches 337, 314 from updating the data unless data bits or check bits are being transmitted.

A further embodiment will be described with reference to FIG. 22.

Figure 14:
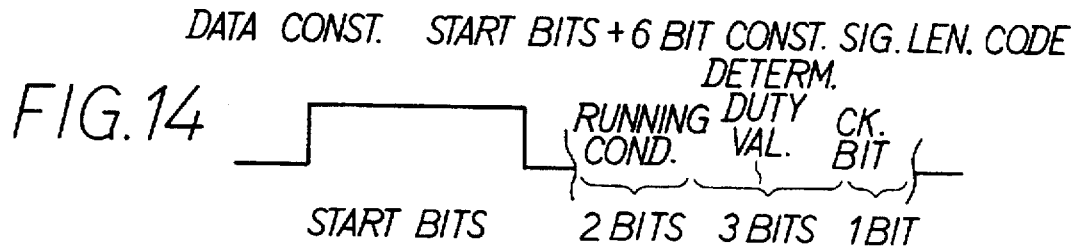
FIG. 14 illustrates a binary pulse train signal used for signal transmission in a second preferred embodiment of the present invention.

This embodiment employs binary pulse train signals indicating data bits (binary data signals) and check bits by the indication method as illustrated in FIG. 14 in conjunction with the second embodiment in which a one-bit-long pulse indicates 0 and a two-bit-long pulse indicates 1. As in the third embodiment illustrated in FIG. 18, the binary pulse train signals are variable in data length. A binary pulse train signal comprises a 5-bit-long start bit signal formed of a 4-long head pulse and a one-bit-long blank bit that follows; a variable length code of two to four bits that follow; and an end bit signal formed of a two-bit-long blank bit signal that follows. The variable length code is composed of a binary data signal (vehicle running condition signal, for-determination generating rate signal) formed of one to three data bits and a check bit that follows. The variable length code is essentially the same as in the third embodiment although the indication method differs.

Figure 22:
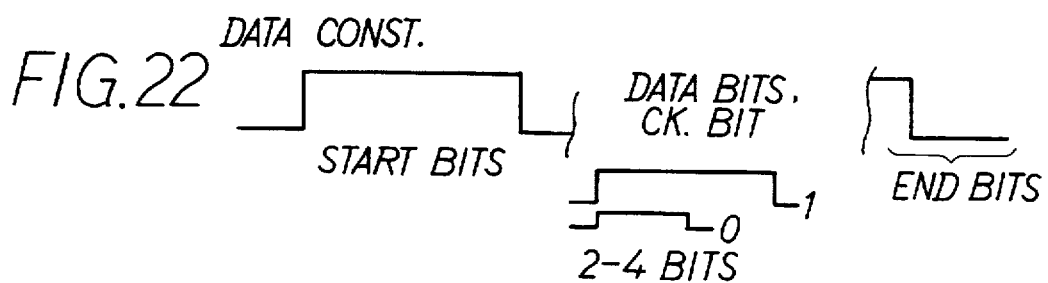
FIG. 22 illustrates a binary pulse train signal used for signal transmission in a fourth preferred embodiment of the present invention.
Figure 23:
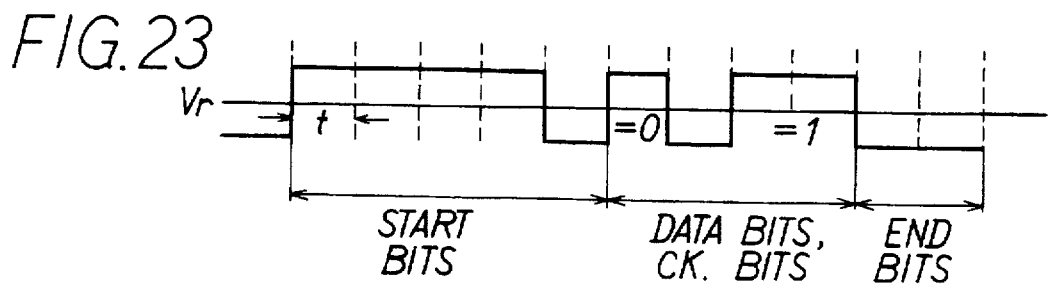
FIG. 23 illustrates an example of the binary pulse train signal shown in FIG. 22.

FIG. 22 illustrates an example of the binary pulse train signal shown in FIG. 23.

Figure 24:
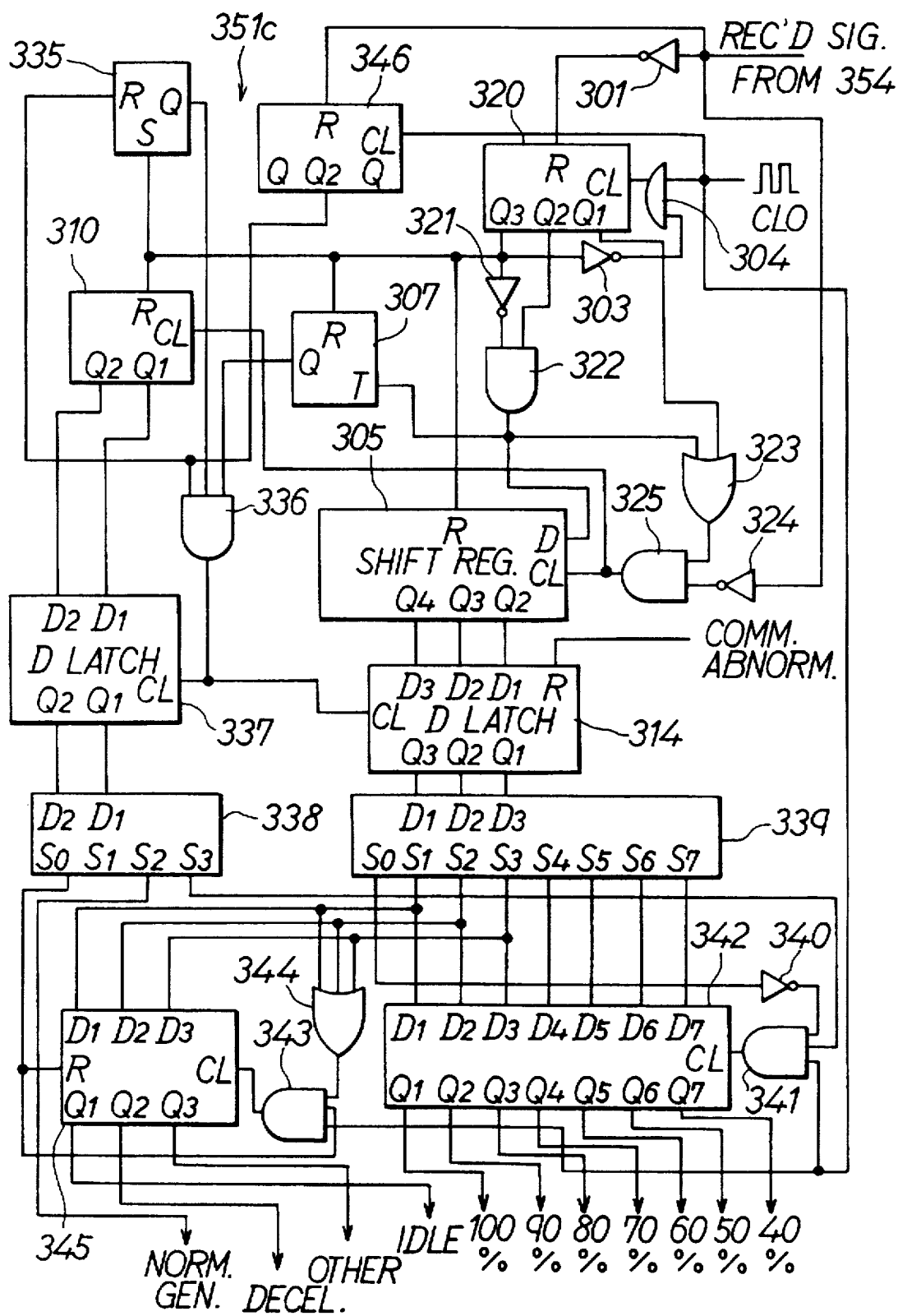
FIG. 24 is a circuit diagram of an example of the demodulating-holding unit according to the fourth embodiment.
Figure 25:
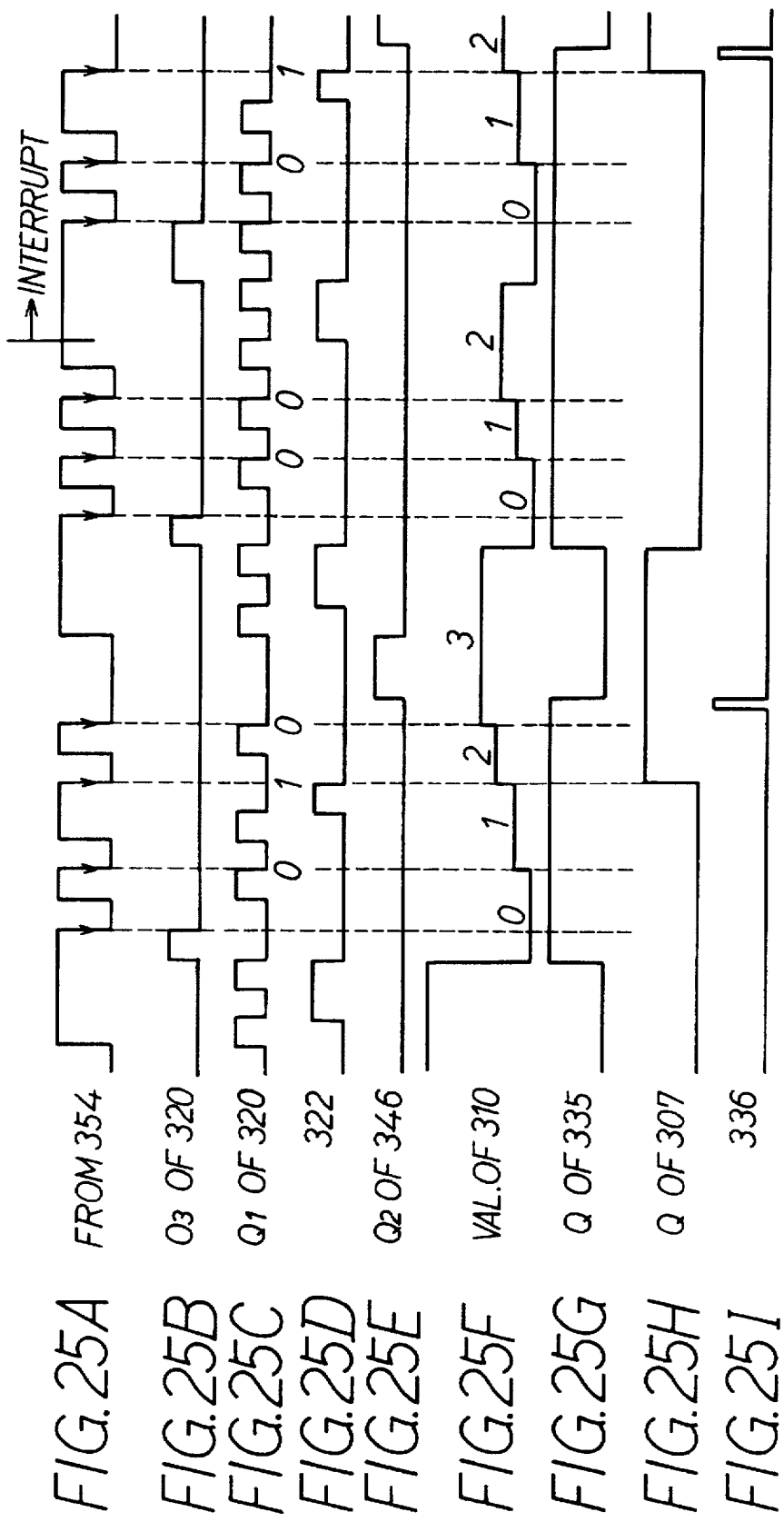
FIGS. 25A–25I are timing charts illustrating the signal status of various portions of the demodulating-holding unit shown in FIG. 24.

FIG. 24 illustrates a demodulating-holding unit 351c according to this embodiment. FIGS. 25A–25I show timing charts illustrating the data status of various portions.

The demodulating-holding unit 351c is a combination of the demodulating-holding unit 351a according to the second embodiment and the demodulating-holding unit 351b according to the third embodiment. The circuits comparable in function to those in the demodulating-holding unit 351a, 351b are denoted by the same reference characters. The following description will be made mainly for the circuitry portions different from those in the demodulating-holding unit 351a, 351b.

Since the end bit signal is formed of a two-bit blank according to this embodiment, an end bit signal is detected by a counter 346 when the low level of a received signal continues for the two-bit duration. Upon detecting an end bit signal, the counter 346 outputs the high level to an AND gate 336.

A counter 310 according to this embodiment counts the rising timing of the received signal from the AND gate 325 as in the counter 310 shown in FIG. 16. Thus, as long as the communication is normal, a latch 337 latches the lower two bits of a binary signal formed to indicate the number of pulses received after detection of a start bit signal. More specifically, since the check bit is always formed of a one-bit binary pulse signal and the binary data signal is one to three-bit binary pulse signal, the latch 337 latches 10 (a one-bit binary data signal), or 11 (a two-bit binary data signal), or 00 (a three-bit binary data signal).

The two-bit binary signal that is held by the latch 337 and that indicates the number of binary data signals is decoded by a decoder 338. The operation that follows is the same as illustrated FIG. 20 will not be described.

A still further embodiment will be described with reference to FIGS. 26–28.

Figures 26, 27:
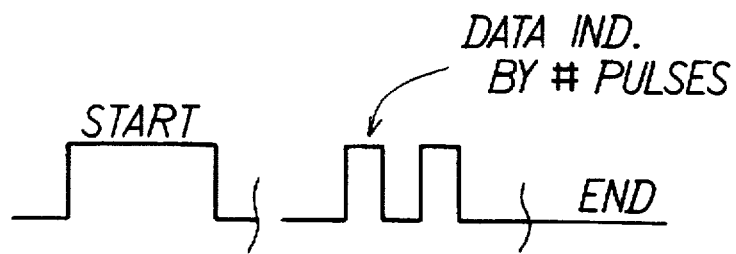
FIG. 26 illustrates a binary pulse train signal used for signal transmission according to a fifth preferred embodiment of the present invention.
FIG. 27 is a code table showing the contents of binary data signals contained in the binary pulse train signal as shown in FIG. 26.

This embodiment employs binary pulse train signals as illustrated in FIG. 26 in which a binary data signal indicates the data by the total number of binary pulses. The end bit signal is a two-bit blank bit signal. FIG. 27 shows the number of data pulses and the corresponding indications.

Figure 28:
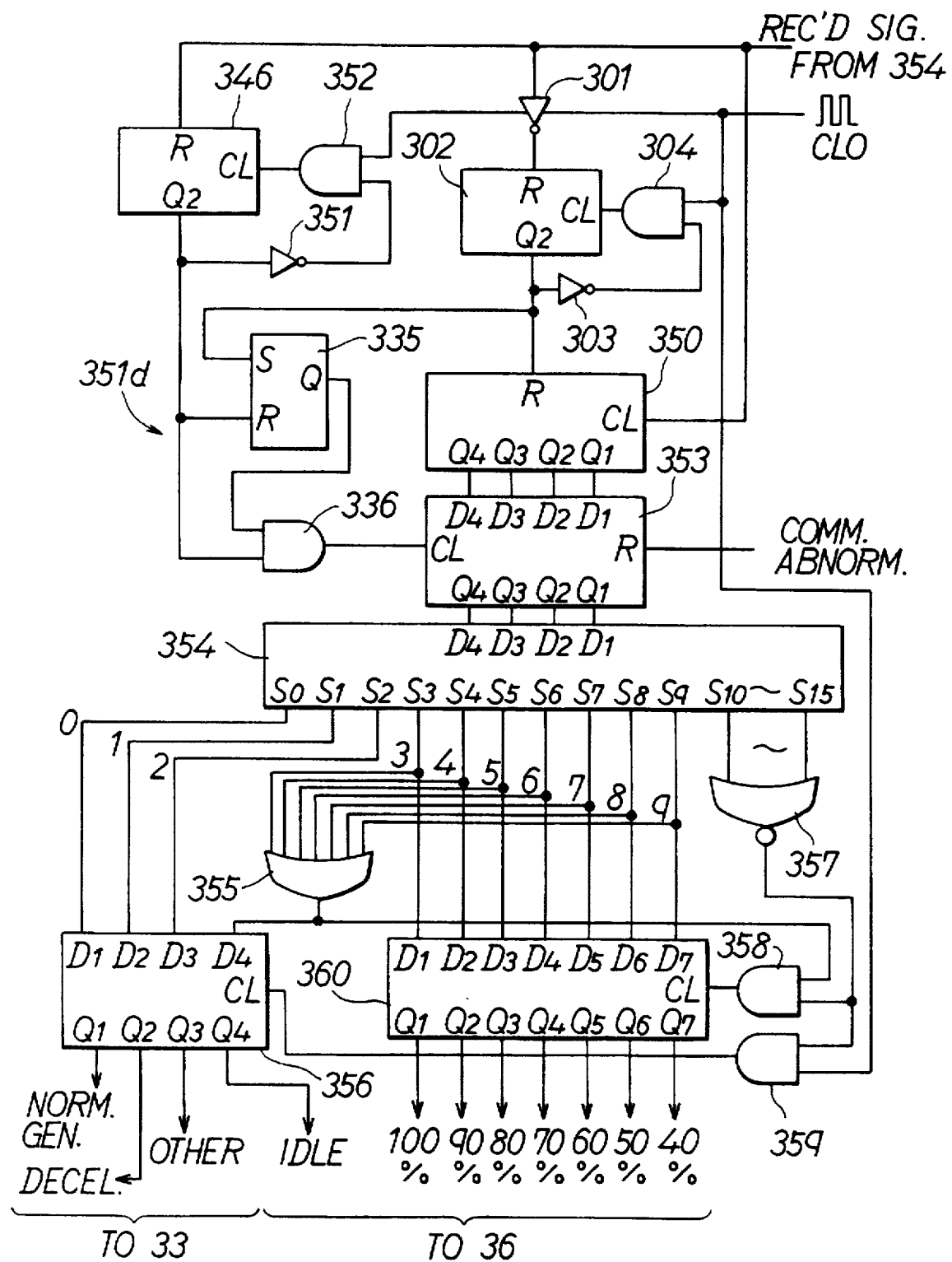
FIG. 28 is a circuit diagram of an example of the demodulating-holding unit 351d according to the fifth embodiment.

FIG. 28 illustrates a demodulating-holding unit according to this embodiment.

A counter 302 counts the pulse length of a received signal and resets a pulse number counter 350 when detecting a start bit signal as in the other embodiments. The pulse number counter 350 then counts received pulses. A counter 346 resets an RS flip-flop 335 when detecting an end bit signal as in the fourth embodiment. The RS flip-flop 335 closes an AND gate 336 except for the data bit transmission period from detection of a start bit signal until detection of the end bit signal as in the fourth embodiment. When an end bit signal is detected during a data bit transmission period, a latch 353 latches the number of data pulses counted by the counter 350.

The data of the latch 353 is decoded by a decoder 354. The content of data is inputted at rising timing of a clock signal into a latch 356 for holding a running condition signal and a latch 360 for holding a for-determination generating rate.

The output of signals $S_3$–$S_9$ from the decoder 354 is to specify a for-determination generating rate. Since it is predetermined that this will occur only in the idle condition, an OR gate 355 then allows a latch 356 to latch the idle condition and a latch 360 for holding a for-determination generating rate to update the data.

The output of signals $S_{10}$–$S_{15}$ from the decoder should not occur. If any of the signals $S_{10}$–$S_{15}$ should be outputted, a NOR circuit 357 closes an AND gate 359 to inhibit data update of the latch 356 that holds a running condition signal and closes an AND gate 358 to inhibit data update of the latch 360. If a communication abnormality signal is inputted into a reset terminal of the latch 353, the signal is decoded by the decoder 354 into S0 which instructs normal power generation.

Figure 29:
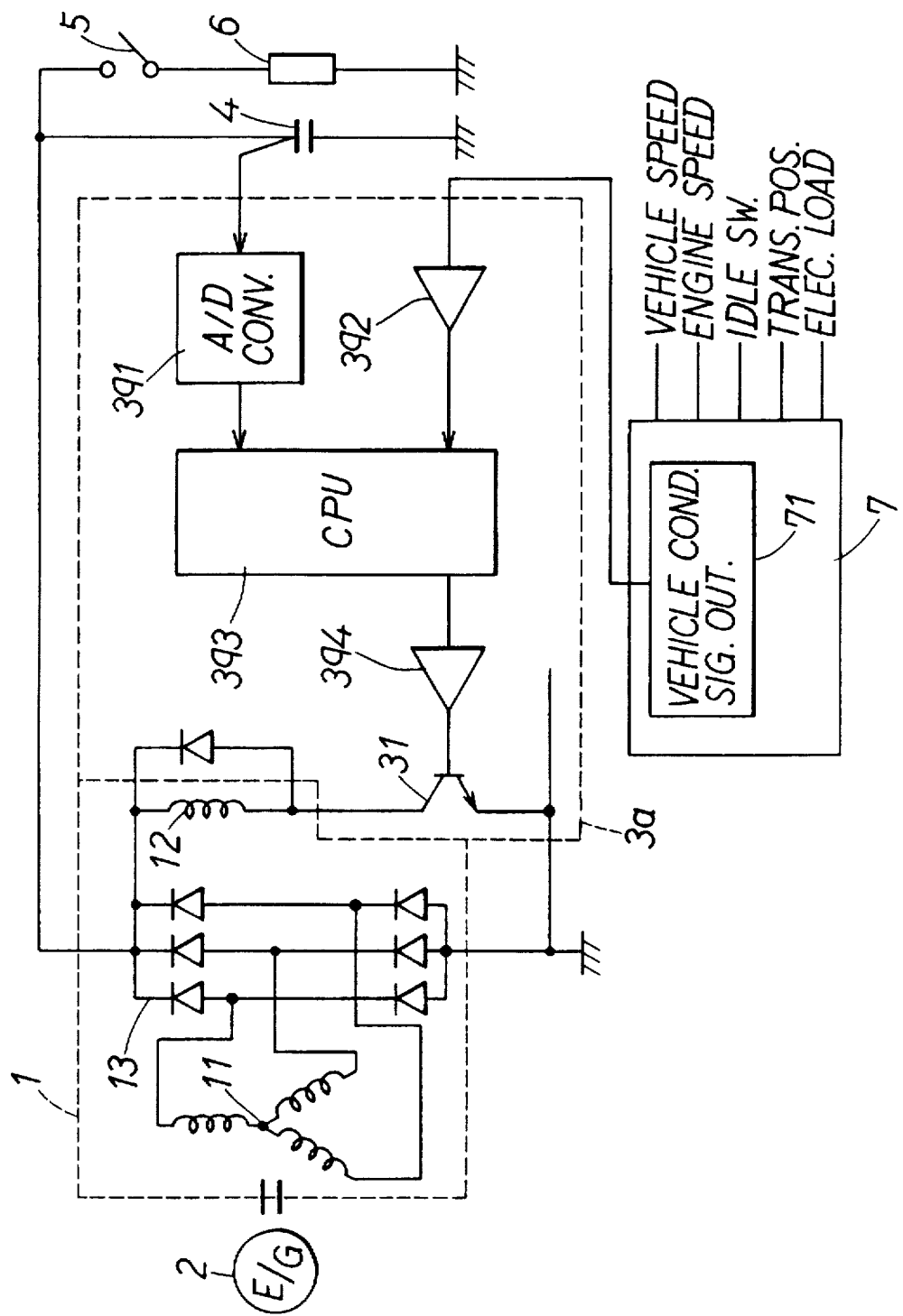
FIG. 29 is a block diagram of a vehicle power generating apparatus according to a sixth preferred embodiment of the present invention.

A further embodiment will be described with reference to FIG. 29.

This embodiment performs the method according to the fifth embodiment in which binary data signals are communicated by the number of pulses, by using a regulator 3a having a CPU. Referring to FIG. 29, the regulator 3a comprises an A/D converter 391 for converting the battery voltage into digital signals, a buffer 392 for shaping the vehicle condition signals from an external control device 7, and a CPU 3a for processing the signals from the buffer 392 and outputting the processed signals to a switching transistor 31 through a buffer 394.

Figure 30:
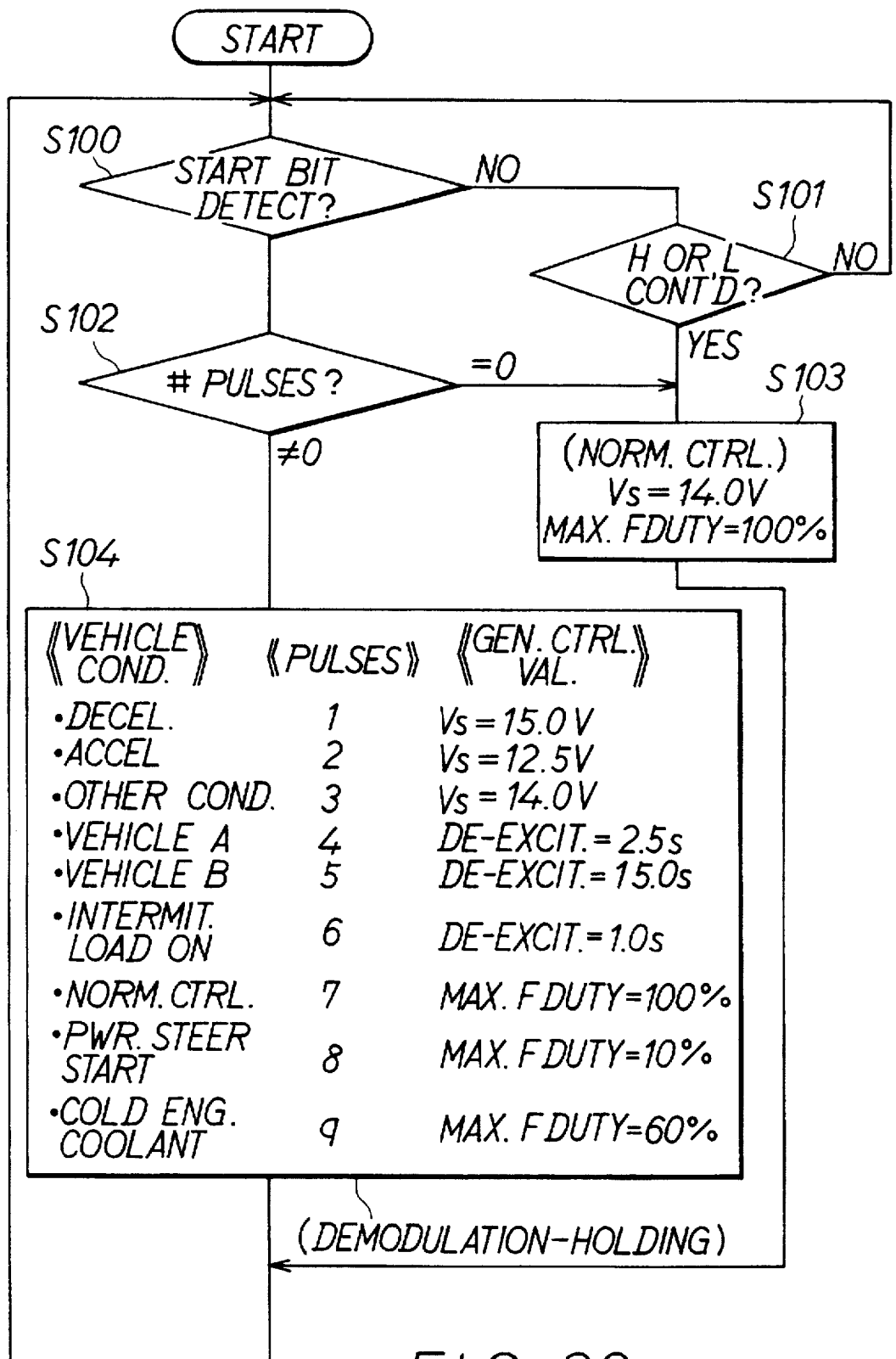
FIG. 30 is a flowchart illustrating the operation of the CPU shown in FIG. 29.

The operation of the CPU 3a will be described with reference to the flowchart of FIG. 30.

The CPU first checks whether a start bit signal has been inputted on the basis of the output from an installed software counter for counting the length of a pulse inputted (S100). If a start bit signal has not been inputted, the CPU checks whether the input electric potential has continued for at least a predetermined length of time (S101). If not, the operation returns to S100, and if it has continued, it is determined that a communication abnormality has occurred and the operation proceeds to Step 103. The external control device 7 transmits an electric potential change, particularly, a pulse, within the aforementioned predetermined length of time without a failure.

If S100 detects a start bit signal, the CPU counts the number of pulses inputted (S102) until an end bit signal (a blank bit signal continuing for a duration of two or more bits) is counted. If the number of pulses counted is 1 to 9, the operation proceeds to S104, and if it is 0, it is determined that a communication error has occurred and the operation proceeds to S103.

S103 sets the target generated voltage Vs to 14.0 V and the maximum generating rate to 100%, and the operation returns to S100.

S104 recognizes the vehicle condition on the basis of the number of pulses inputted and updates data to the corresponding three kinds of power generation control values (target generated voltage Vs, gradual excitation time, maximum Fduty) and stores them.

Figure 31:
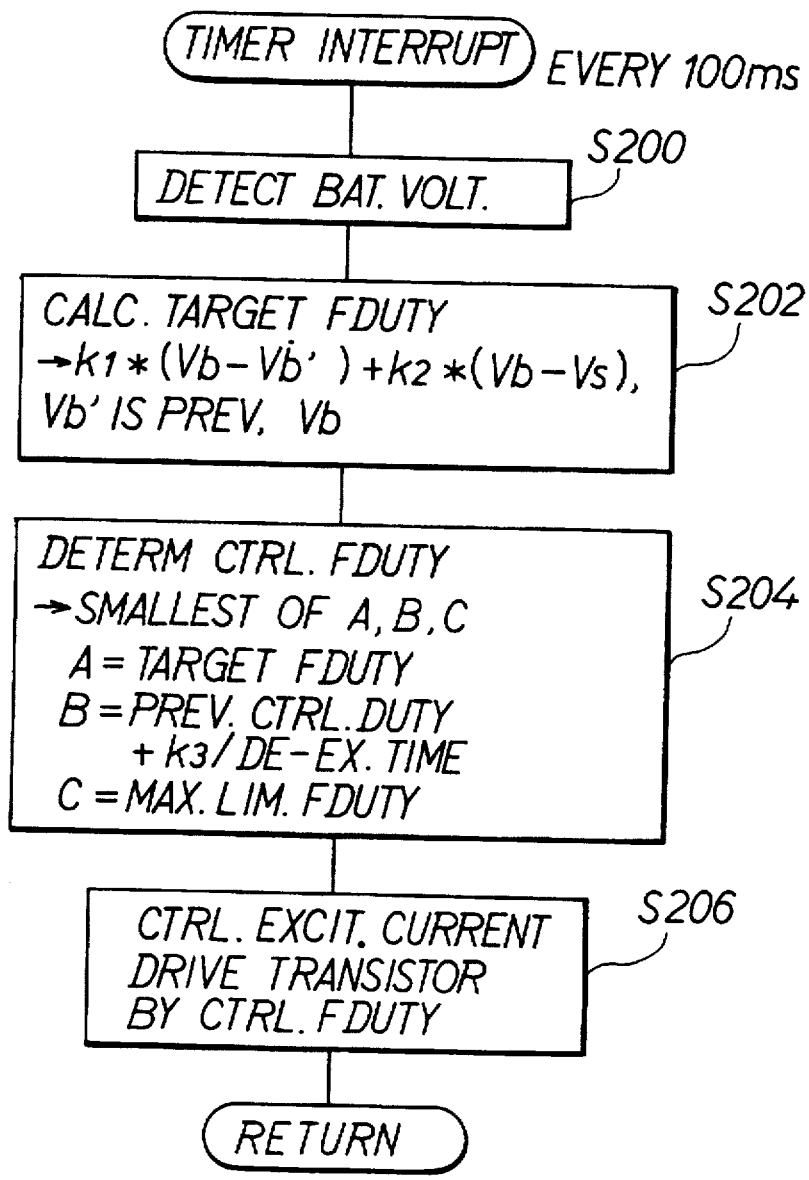
FIG. 31 is a flowchart illustrating the operation of the CPU shown in FIG. 29.

An example of power generation control using any of the three kinds of generation control values (target generated voltage Vs, gradual excitation time, maximum Fduty) will be described with reference to the interruption routine of FIG. 31.

This interruption routine, executed every 10 ms, first detects a battery voltage Vb (S200), and then calculates a target generating rate (target Fduty) based on the battery voltage Vb and the target generated voltage Vs (S202).

The smallest value among A, B and C shown in S204 is selected as a selected generating rate (control Fduty) (S204). Using the selected Fduty, the switching transistor 31 is switch-controlled (S206).

Since the embodiments are capable of transmitting a variety of vehicle running condition signals, they enable sophisticated control, for example, in cooperation with the engine ECU, as well as voltage control. In addition, since the embodiments can transmit a plurality of control parameters, they do not require changes in regulators when applied to vehicles having different parameters.

With the embodiments, various controls can be employed, for example, regeneration control during deceleration, setting of de-excitation time suitable for a vehicle in which power generation is restrained during acceleration (function of preventing engine stall caused by a sharp increase in power generation when electric loading is started), power generation cut for preventing engine stall when the power steering is started, idle speed stabilizing control by curbing power generation at the engine start (low engine coolant temperature).

Although the present invention has been fully described in connection with the preferred embodiments thereof with reference to the accompanying drawings, it is to be noted that various changes and modifications will become apparent to those skilled in the art. Such changes and modifications are to be understood as being included within the scope of the present invention as defined by the appended claims.

What is claimed is:

1. A vehicle power generating apparatus comprising an electric power generator that is drivable by an engine of a vehicle for supplying electric power for an electric load and for charging a battery, a generated voltage control device for controlling power generation by controlling exciting current of said power generator to maintain generated voltage to a predetermined level, and an external control device disposed apart from said generated voltage control device for transmitting a predetermined signal to said generated voltage control device, wherein:

said external control device includes transmitting means for transmitting a binary pulse train signal of a limited length that includes a data pulse signal which is essentially composed of a predetermined number of binary pulse signals and which indicates a vehicle condition signal related to a predetermined vehicle condition; and said generated voltage control device comprises receiving means for receiving said binary pulse train signal and for demodulating said data pulse signal to said vehicle condition signal, holding means for holding one of said data pulse signal and said vehicle condition signal at least until a next time said binary pulse train signal is received, and exciting current control means for controlling said exciting current based on one of said vehicle condition signal held by said holding means and said vehicle condition signal obtained by demodulating said data pulse signal held by said holding means.

2. A vehicle power generating apparatus according to claim 1, wherein said transmitting means is for transmitting plural kinds of vehicle condition signals by using said data pulse signal that includes a plurality of said binary pulse signals, and wherein said receiving means is for demodulating said data pulse signal to said plural kinds of vehicle condition signals.

3. A vehicle power generating apparatus according to claim 2, wherein said binary pulse train signal is serially transmitted through a single transmission line.

4. A vehicle power generating apparatus according to claim 1, wherein said data pulse signal indicates one of a plurality of states of said vehicle condition signal and different vehicle condition signals by combinations of a plurality of binary pulse signals that are updated at a predetermined cycle.

5. A vehicle power generating apparatus according to claim 1, wherein said data pulse signal indicates one of a plurality states of said vehicle condition signal and different vehicle condition signals by combinations of a plurality of binary pulse signals that have pulse widths different from one another.

6. A vehicle power generating apparatus according to claim 1, wherein said data pulse signal indicates one of a plurality of states of said vehicle condition signal and different vehicle condition signals by a total number of a plurality of binary pulse signals that have a predetermined pulse width.

7. A vehicle power generating apparatus according to claim 1, wherein said binary pulse train signal includes at least one of a leading pulse signal indicating a start of transmission of said binary pulse train signal and an end pulse signal indicating an end of transmission of said binary pulse signal.

8. A vehicle power generating apparatus according to claim 7, wherein said holding means continues holding said data pulse signal or said vehicle condition signal previously received if during a period of receiving said data pulse signal determined on the basis of said leading pulse signal or said end pulse signal, said leading pulse signal is detected or said end pulse signal is not detected.

9. A vehicle power generating apparatus according to claim 1, wherein said vehicle condition signal comprises at least one of a running condition signal regarding vehicle running conditions, a battery condition signal regarding conditions of a vehicle installed battery, a model signal regarding vehicle models, and load condition signal regarding conditions of energization of an electric load provided in said vehicle, and wherein said generated voltage control device generates a power generation control signal based on said vehicle condition signal obtained from said holding means or based on said vehicle condition signal and a signal regarding power generation conditions obtained from said power generator, and said generated voltage control device controls said exciting current on the basis of said power generation control signal.

10. A vehicle power generating apparatus according to claim 1, wherein said external control device changes a level of a binary pulse signal to be transmitted at least once within a predetermined length of time, and wherein said generated voltage control device causes said holding means to stop holding said vehicle condition signal or said data pulse signal previously received and then hold a predetermined signal, if a received signal does not exhibit a level change of said binary pulse signal within said predetermined length of time.

11. A vehicle power generating apparatus according to claim 1, wherein said vehicle condition signal includes a key switch closure signal regarding whether a key switch has been closed or open, and wherein said generated voltage control device stops said power generation control if it is determined that said key switch has been open on the basis of said key switch closure signal received.

12. A vehicle power generating apparatus according to claim 11, wherein while said key switch is closed, said external control device transmits said key switch closure signal indicating closure of said key switch at least once within a predetermined length of time, and wherein if said key switch closure signal is not received within said predetermined length of time, said generated voltage control device determines that said key switch is not closed and stops said power generation control.

13. A vehicle power generating apparatus according to claim 12, wherein said external control device transmits said binary pulse train signal including a binary pulse signal that forms said key switch closure signal indicating closure of said key switch at least once within a predetermined length of time, and wherein if said key switch closure signal is not received within said predetermined length of time, said generated voltage control device determines that said key switch is not closed.

14. A vehicle power generating apparatus according to claim 11, wherein while said key switch is closed, said external control device changes a binary signal level of a signal to be transmitted at least once within a predetermined length of time, and wherein said generated voltage control device determines that said key switch is closed if a received signal level changes within said predetermined length of time, and determines that said key switch is not closed if a received signal level does not change within said predetermined length of time.

15. A vehicle power generating apparatus according to claim 11, wherein said generated voltage control device determines that said key switch is closed if a received signal is a predetermined level of a binary signal, and determines that said key switch is not closed if a binary signal of a level different from said predetermined level continues to be received for a predetermined length of time or longer.

16. A vehicle power generating apparatus according to claim 15, wherein said binary signal of a level different from said predetermined level is a voltage status of a transmission terminal of said external control device when said external control device is not supplied with electricity.

17. A vehicle power generating apparatus according to claim 11, wherein said generated voltage control device monitors power generating conditions of said power generator, and wherein while said generator is generating power, said generated voltage control device continues said power generation control if it is determined that said key switch is not closed.

* * * * *